(12) United States Patent
Kimura

(10) Patent No.: US 12,140,948 B2
(45) Date of Patent: Nov. 12, 2024

(54) INFORMATION PROCESSING DEVICE, INFORMATION PROCESSING METHOD, INFORMATION PROCESSING PROGRAM, AND CONTROL DEVICE

(71) Applicant: Sony Group Corporation, Tokyo (JP)

(72) Inventor: Tomoya Kimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 304 days.

(21) Appl. No.: 17/632,791

(22) PCT Filed: Jul. 8, 2020

(86) PCT No.: PCT/JP2020/026667
§ 371 (c)(1),
(2) Date: Feb. 4, 2022

(87) PCT Pub. No.: WO2021/049147
PCT Pub. Date: Mar. 18, 2021

(65) Prior Publication Data
US 2022/0291679 A1 Sep. 15, 2022

(30) Foreign Application Priority Data

Sep. 11, 2019 (JP) ................................. 2019-165477

(51) Int. Cl.
*G05D 1/00* (2024.01)
(52) U.S. Cl.
CPC ......... *G05D 1/0044* (2013.01); *G05D 1/0016* (2013.01); *G05D 1/0219* (2013.01); *G05D 1/0246* (2013.01)

(58) Field of Classification Search
CPC .................................................... G05D 1/0044
See application file for complete search history.

(56) References Cited

U.S. PATENT DOCUMENTS

2009/0254235 A1* 10/2009 Kuroda ................... G01S 17/66
701/23
2019/0122568 A1* 4/2019 Nevdahs ................ G05D 1/106

FOREIGN PATENT DOCUMENTS

JP 2010-250536 A 11/2010
JP 2014-113864 A 6/2014
(Continued)

OTHER PUBLICATIONS

International Search Report and Written Opinion mailed on Sep. 24, 2020, received for PCT Application PCT/JP2020/026667, Filed on Jul. 8, 2020, 9 pages including English Translation.

*Primary Examiner* — Vivek D Koppikar
*Assistant Examiner* — Paul W Arellano
(74) *Attorney, Agent, or Firm* — XSENSUS LLP

(57) ABSTRACT

An information processing device (100) includes an acquisition unit (151) that acquires instruction information including an instruction from an operator on a moving direction for a moving body, a transformation unit (154) that transforms the moving direction included in the instruction information acquired by the acquisition unit (151) into a moving direction in a relative coordinate system based on a reference position, which is determined according to a surrounding environment of the moving body, and a relative position of the moving body, and a control unit (156) that controls a moving direction of the moving body on the basis of the moving direction transformed by the transformation unit (154).

10 Claims, 21 Drawing Sheets

(56) References Cited

FOREIGN PATENT DOCUMENTS

| JP | 2018-110352 A | | 7/2018 |
| JP | 2018110352 | * | 7/2018 |
| JP | 2019-511044 A | | 4/2019 |
| JP | 2019511044 | * | 4/2019 |
| WO | 2018/034295 A1 | | 2/2018 |

* cited by examiner

FIG.4

| INSTRUCTION INFORMATION ID | DATE AND TIME | MOVING DIRECTION | COORDINATE SYSTEM | REFERENCE POSITION | ... |
|---|---|---|---|---|---|
| CM1 | DT1 | MOVE FORWARD AT 90 DEGREE TO RIGHT | RELATIVE COORDINATE SYSTEM | POSITION OF CONTROL DEVICE 50 | ... |
| ... | ... | ... | ... | ... | ... |

| PROCESSING INFORMATION ID | DATE AND TIME | REFERENCE POSITION COORDINATE | SELF-POSITION COORDINATE | RELATIVE POSITION COORDINATE | ... |
|---|---|---|---|---|---|
| PS1 | DT1 | (5, 10) | (15, 15) | (10, 5) | ... |
| ... | ... | ... | ... | ... | ... |

| CONDITION INFORMATION ID | SENSOR INFORMATION TYPE | CONDITION INFORMATION | THRESHOLD | ... |
|---|---|---|---|---|
| CD1 | SIGNAL FROM ANOTHER MOVING BODY | DETECT RETURN SIGNAL | THRESHOLD #1 | ... |
| CD2 | IMAGE | DETECT CHANGE IN TRAVELING DIRECTION OF SUBJECT | THRESHOLD #2 | ... |
| CD3 | IMAGE | DETECT WINDING UP BY PITCHER | THRESHOLD #3 | ... |
| CD4 | IMAGE | DETECT CHANGE IN SPEED OF SUBJECT | THRESHOLD #4 | ... |
| CD5 | IMAGE | DETECT INDIVIDUAL SEPARATED FROM CENTROID | THRESHOLD #5 | ... |
| CD6 | LIGHT | DETECT MOMENT OF EXPLOSION OF FIREWORK | THRESHOLD #6 | ... |
| CD7 | SOUND | DETECT ANNOUNCEMENT OF FINALE | THRESHOLD #7 | ... |
| CD8 | IMAGE | DETECT CHANGE IN DESTINATION OF LINE OF SIGHT OF CROWD | THRESHOLD #8 | ... |
| CD9 | INFRARED RAY | DETECT RECEPTION BLOCKING | THRESHOLD #9 | ... |
| CD10 | WATER PRESSURE | DETECT THAT WATER PRESSURE IS EQUAL TO OR HIGHER THAN THRESHOLD | THRESHOLD #10 | ... |
| CD11 | TEMPERATURE | DETECT THAT TEMPERATURE OF SUBJECT IS EQUAL TO OR HIGHER THAN THRESHOLD | THRESHOLD #11 | ... |
| CD12 | WIND PRESSURE | DETECT THAT WIND PRESSURE IS LOWER THAN THRESHOLD | THRESHOLD #12 | ... |
| CD13 | VIBRATION | DETECT THAT VIBRATION IS EQUAL TO OR LARGER THAN THRESHOLD | THRESHOLD #13 | ... |
| ... | ... | ... | ... | ... |

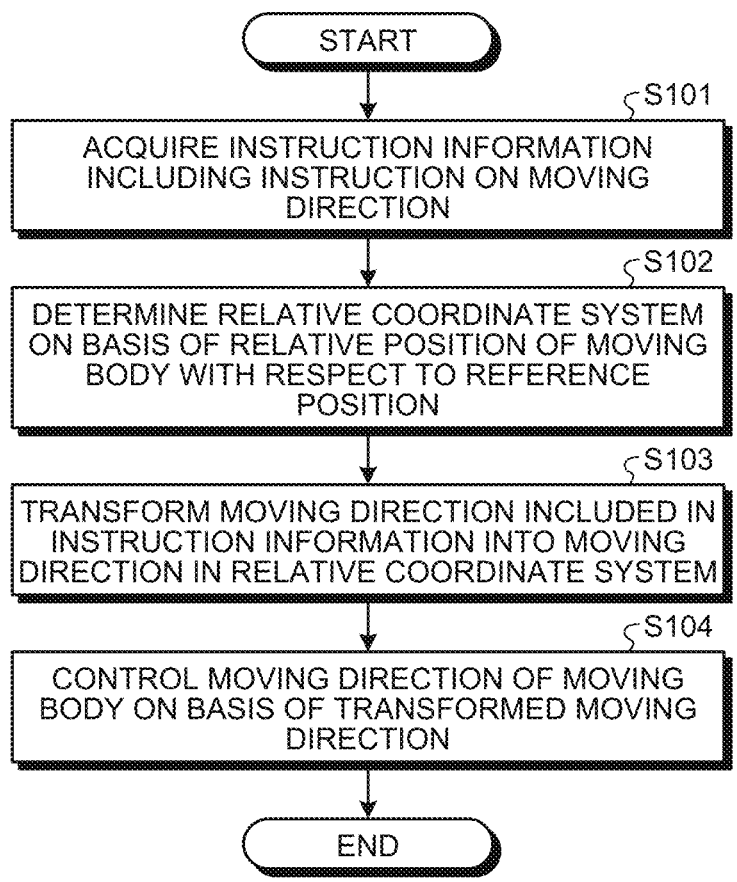

FIG.9
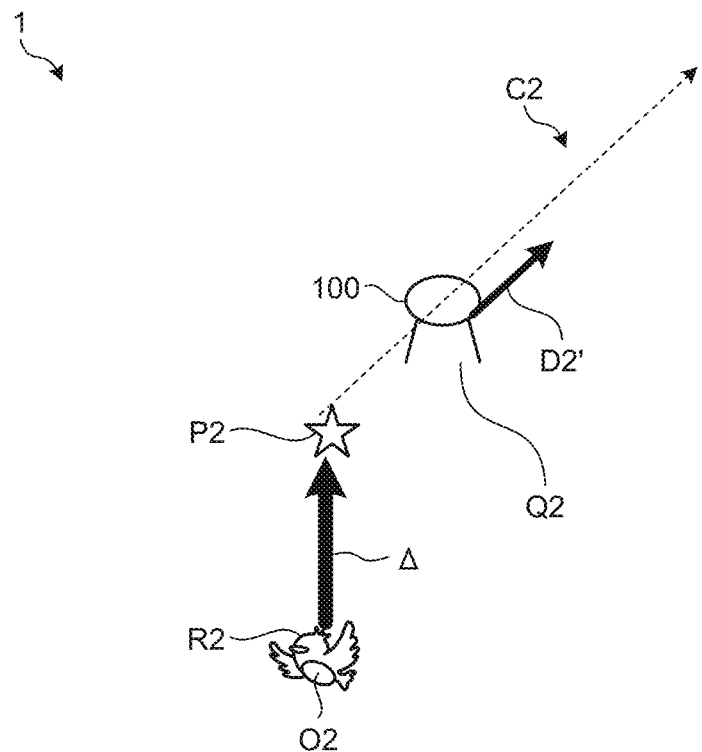
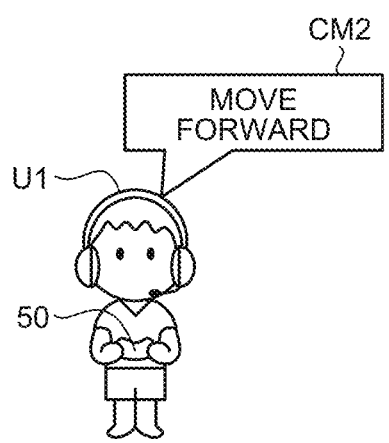

FIG.11
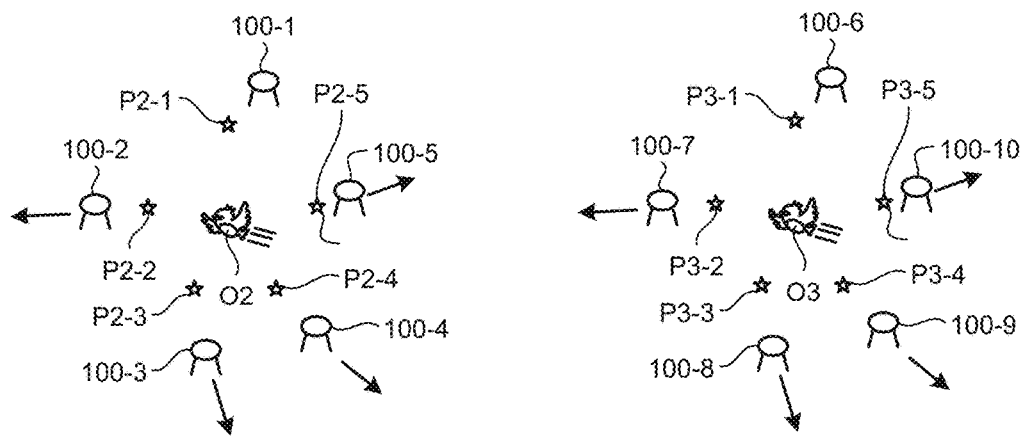
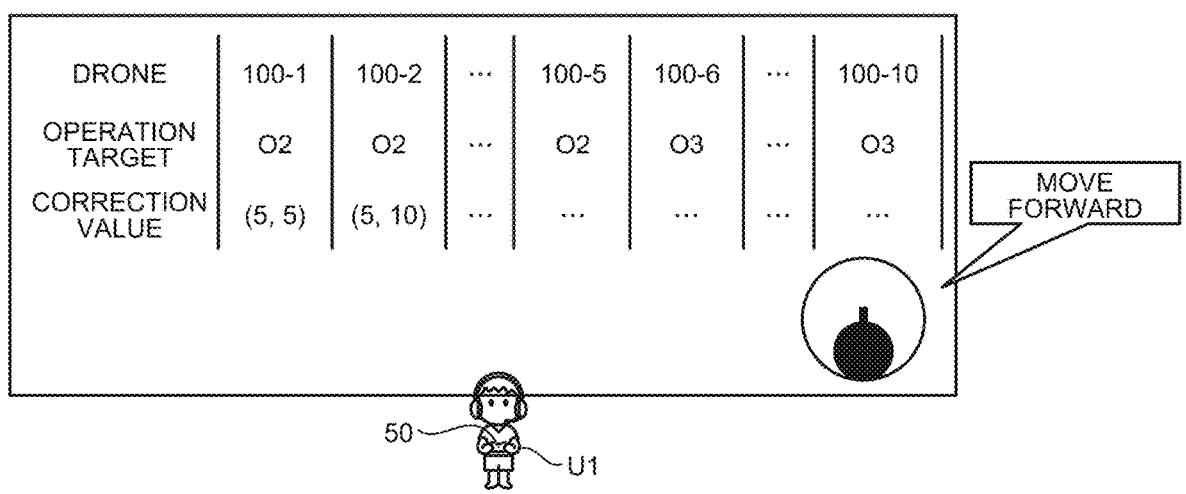

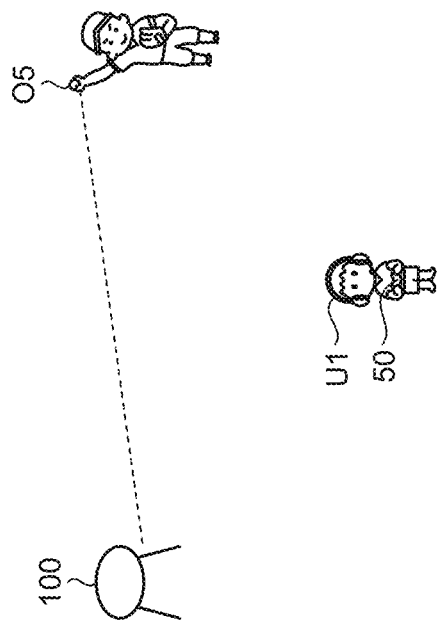
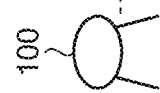
FIG.14

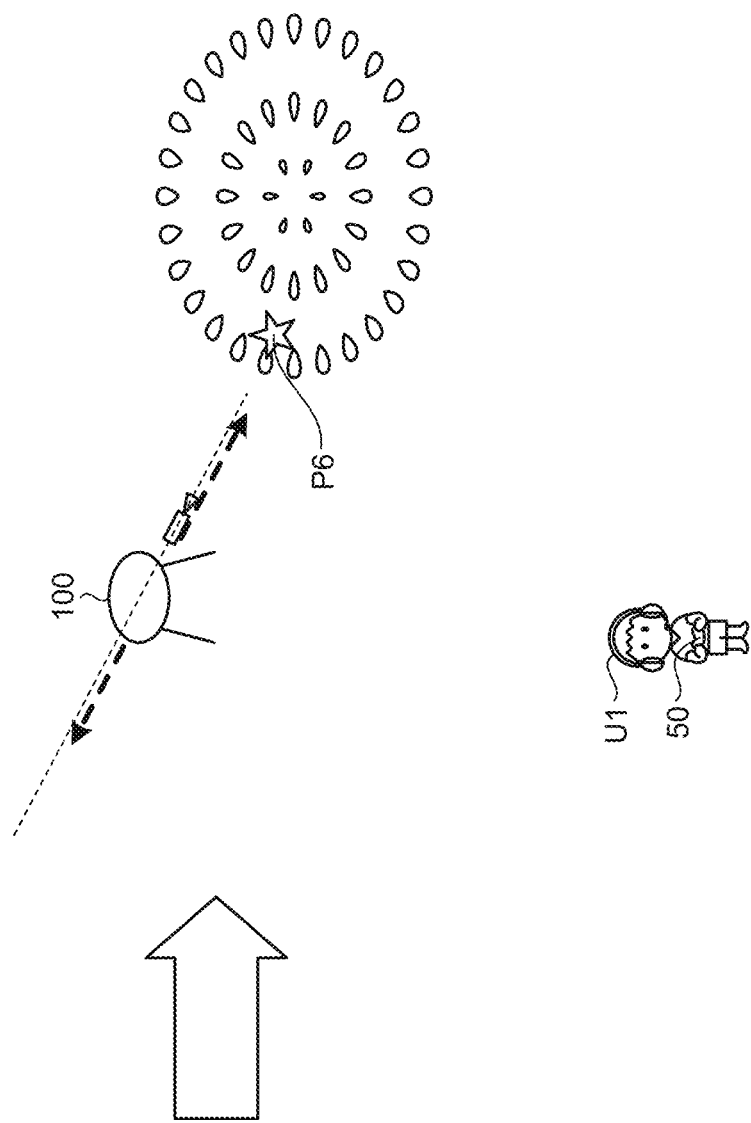
FIG.17
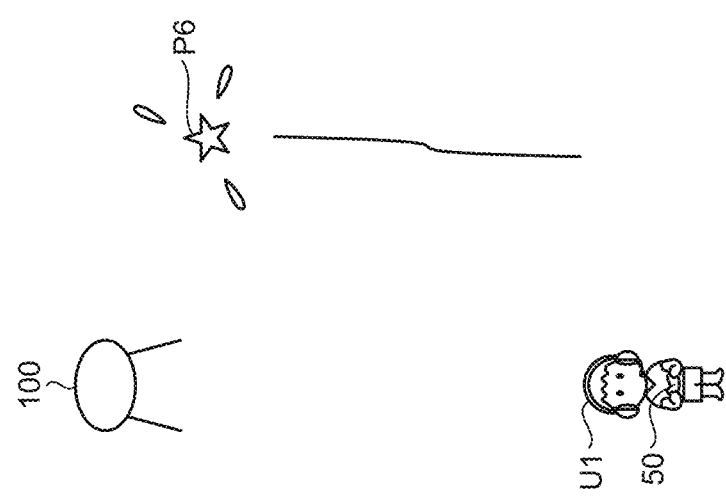

FIG.18
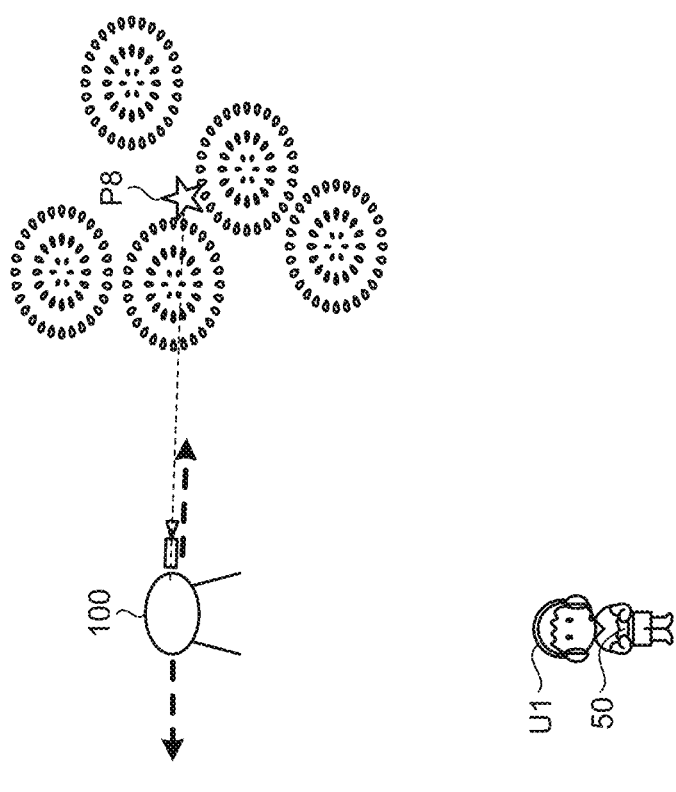
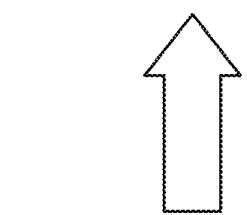
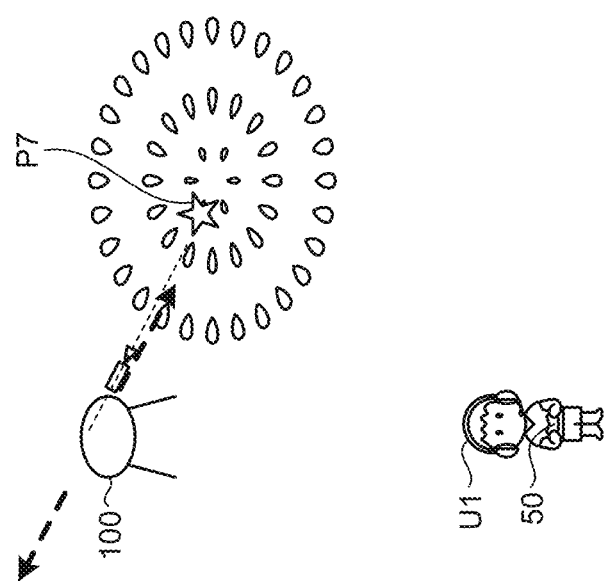

FIG.22
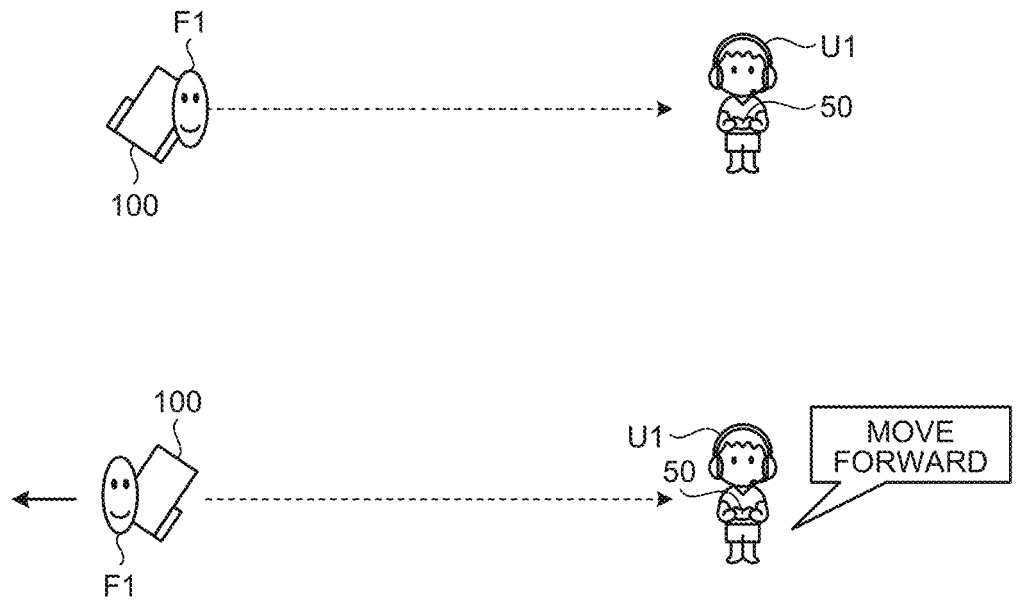
FIG.23
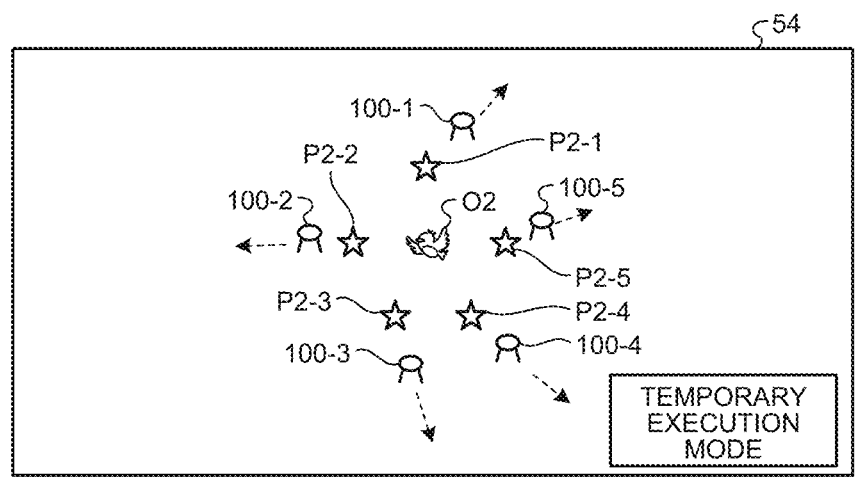
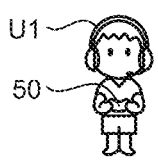

INFORMATION PROCESSING DEVICE, INFORMATION PROCESSING METHOD, INFORMATION PROCESSING PROGRAM, AND CONTROL DEVICE

CROSS-REFERENCE TO RELATED APPLICATIONS

The present application is based on PCT filing PCT/JP2020/026667, filed Jul. 8, 2020, which claims priority to JP 2019-165477, filed Sep. 11, 2019, the entire contents of each are incorporated herein by reference.

FIELD

The present invention relates to an information processing device, an information processing method, an information processing program, and a control device.

BACKGROUND

Conventionally, a technology of facilitating an operation of a moving body has been known. For example, in a global coordinate system in which a predetermined reference position in a moving environment is the origin, a waypoint is set at a point away from a self-position for a predetermined distance in a relative direction with respect to the moving body. Then, a technology of controlling the moving body to move to the set waypoint while autonomously avoiding a collision with an obstacle has been proposed.

CITATION LIST

Patent Literature

Patent Literature 1: Japanese Patent Application Laid-open No. 2010-250536

SUMMARY

Technical Problem

However, in the above-described related art, it is not always possible to appropriately control a moving direction of a moving body. For example, in the above-described related art, the moving body is merely moved to a set waypoint while autonomously avoiding a collision with an obstacle, and the moving direction of the moving body cannot always be controlled appropriately.

The present application has been made in view of the above, and is to provide an information processing device, an information processing method, an information processing program, and a control device capable of appropriately controlling a moving direction of a moving body.

Solution to Problem

To solve the above problem, an information processing device comprising:

an acquisition unit that acquires instruction information including an instruction from an operator on a moving direction for a moving body;

a transformation unit that transforms the moving direction included in the instruction information acquired by the acquisition unit into a moving direction in a relative coordinate system based on a reference position, which is determined according to a surrounding environment of the moving body, and a relative position of the moving body; and a control unit that controls a moving direction of the moving body on the basis of the moving direction transformed by the transformation unit.

BRIEF DESCRIPTION OF DRAWINGS

FIG. 4 is a view illustrating an example of an instruction information storage unit according to the embodiment of the present disclosure.

FIG. 5 is a view illustrating an example of a processing information storage unit according to the embodiment of the present disclosure.

FIG. 6 is a view illustrating an example of a condition information storage unit according to the embodiment of the present disclosure.

FIG. 7 is a flowchart illustrating a procedure of the information processing according to the embodiment of the present disclosure.

FIG. 9 is a view illustrating an example of information processing according to a second modification example of the present disclosure.

FIG. 11 is a view illustrating an example of information processing according to a fourth modification example of the present disclosure.

FIG. 14 is a view illustrating an example of information processing according to a seventh modification example of the present disclosure.

FIG. 17 is a view illustrating an example of information processing according to a tenth modification example of the present disclosure.

FIG. 18 is a view illustrating an example of information processing according to an eleventh modification example of the present disclosure.

FIG. 22 is a view illustrating an example of information processing according to other embodiments of the present disclosure.

FIG. 23 is a view illustrating a configuration example of a terminal device according to the other embodiments of the present disclosure.

DESCRIPTION OF EMBODIMENTS

In the following, embodiments of the present disclosure will be described in detail on the basis of the drawings. Note that in each of the following embodiments, overlapped description is omitted by assignment of the same reference sign to identical parts.

The present disclosure will be described in the following order of items.

1. Embodiment
   1-1. Outline of Information Processing According to the Embodiment
   1-2. Configuration of Information Processing System According to the Embodiment
   1-3. Configuration of Moving Body Device According to the Embodiment
      1-3-1. Configuration of Communication Unit According to the Embodiment
      1-3-2. Configuration of Storage Unit According to the Embodiment
         1-3-2-1. Configuration of Instruction Information Storage Unit According to the Embodiment
         1-3-2-2. Configuration of Processing Information Storage Unit According to the Embodiment
         1-3-2-3. Configuration of Condition Information Storage Unit According to the Embodiment
      1-3-3. Configuration of Physical Sensor According to the Embodiment
      1-3-4. Configuration of Drive Unit According to the Embodiment
      1-3-5. Configuration of Control Unit According to the Embodiment
   1-4. Procedure of Information Processing According to the Embodiment
   1-5. Configuration of Control Device According to the Embodiment
   1-6. Modification Example of the Embodiment
      1-6-1. First Modification Example of the Embodiment
      1-6-2. Second Modification Example of the Embodiment
      1-6-3. Third Modification Example of the Embodiment
      1-6-4. Fourth Modification Example of the Embodiment
      1-6-5. Fifth Modification Example of the Embodiment
      1-6-6. Sixth Modification Example of the Embodiment
      1-6-7. Seventh Modification Example of the Embodiment
      1-6-8. Eighth Modification Example of the Embodiment
      1-6-9. Ninth Modification Example of the Embodiment
      1-6-10. Tenth Modification Example of the Embodiment
      1-6-11. Eleventh Modification Example of the Embodiment
      1-6-12. Twelfth Modification Example of the Embodiment
      1-6-13. Thirteenth Modification Example of the Embodiment
      1-6-14. Fourteenth Modification Example of the Embodiment
      1-6-15. Fifteenth Modification Example of the Embodiment
2. Other Embodiments
   2-1. Case Where Moving Body Moves in Three-dimensional Space
3. Effects According to the Present Disclosure
4. Hardware Configuration

1. Embodiment

1-1. Outline of Information Processing According to the Embodiment

Figure 1:
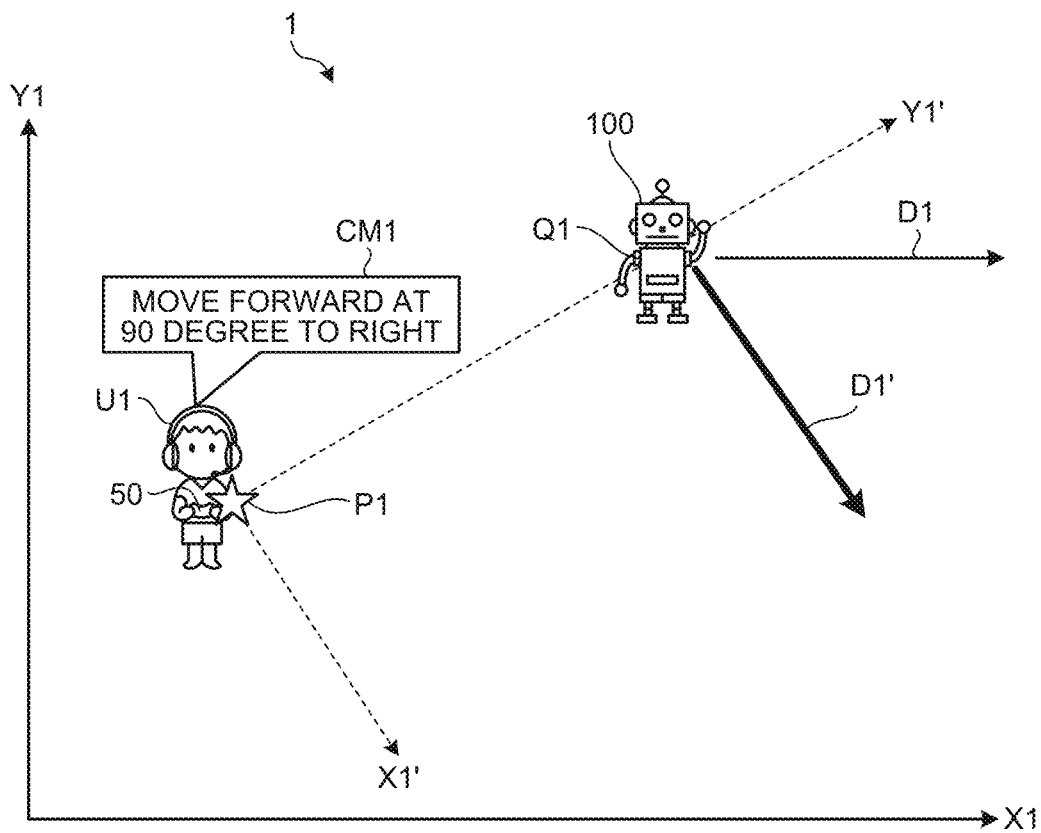
FIG. 1 is a view illustrating an example of information processing according to an embodiment of the present disclosure.

First, an outline of information processing according to an embodiment of the present disclosure will be described with reference to FIG. 1. FIG. 1 is a view illustrating an example of the information processing according to the embodiment of the present disclosure. The information processing according to the embodiment of the present disclosure is realized by an information processing system 1 illustrated in FIG. 1. In the example illustrated in FIG. 1, an operator U1 operates, by using a control device 50, a moving body device 100 that is a robot capable of autonomously moving (for example, walking) on the ground. The moving body device 100 moves on a two-dimensional plane in response to an instruction from the operator U1.

Figure 2:
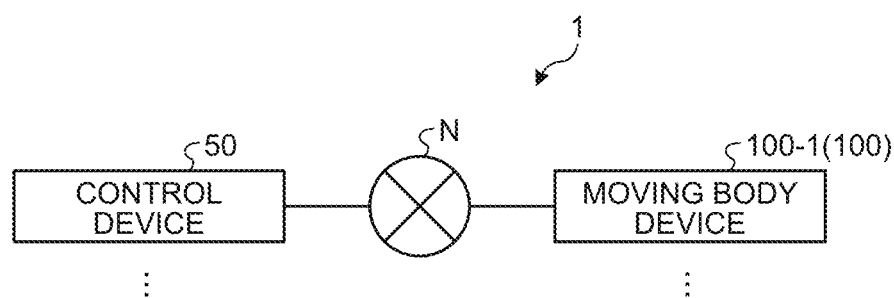
FIG. 2 is a view illustrating a configuration example of an information processing system according to the embodiment of the present disclosure.

1-2. Configuration of Information Processing System According to the Embodiment Next, a configuration of an information processing system according to the embodiment of the present disclosure will be described with reference to FIG. 1 and FIG. 2. FIG. 2 is a view illustrating a configuration example of the information processing system according to the embodiment of the present disclosure. As illustrated in FIG. 2, the information processing system 1 includes the control device 50 and the moving body device 100. The control device 50 and the moving body device 100 are communicably connected in a wired or wireless manner via a predetermined network N. Note that the information processing system 1 illustrated in FIG. 2 may include the arbitrary number of control devices 50 and the arbitrary number of moving body devices 100. Also, the information processing system 1 illustrated in FIG. 2 may include a terminal device 10 (not illustrated in FIG. 2) of an operator who operates the control device 50.

The moving body device 100 is a machine (device) that can autonomously operate by using an electric and/or magnetic action, or another general moving body device. In the example illustrated in FIG. 1, the moving body device 100 is a robot (such as robot pet) capable of autonomously moving (for example, walking) on the ground. However, the present embodiment is not limited to such an example, and the moving body device 100 may be another kind of robot (such as humanoid robot or drone), a vehicle (such as car, ship, or flying vehicle), various industrial machines, a toy, or the like. Note that the moving body device 100 may be simply referred to as a moving body in the following.

Also, the moving body device 100 estimates a self-position during a movement. The moving body device 100 estimates, as the self-position, an absolute position (absolute position) of the moving body device 100 in a real space. For example, the moving body device 100 includes various kinds of sensors to acquire absolute coordinates of the self-position, and acquires the absolute coordinates of the self-position during the movement. In FIG. 1, an X-axis of an absolute coordinate system is indicated by X1, and a Y-axis of the absolute coordinate system is indicated by Y1. Also, a position of the moving body device 100 is indicated by Q1, and a position of the control device 50 (same as a position of the operator U1 in FIG. 1) is indicated by P1.

The control device 50 is a controller to operate the moving body device 100. The control device 50 is an information processing device used by an operator who operates the moving body device 100. In FIG. 1, the control device 50 is gripped by a hand of the operator U1 who operates the moving body device 100. For example, the control device 50 may be a terminal device 10 used by the operator. For example, the control device 50 may be a cellular phone such as a smartphone, a tablet terminal, a personal digital assistant (PDA), a desktop-type personal computer (PC), or a notebook-type PC.

The control device 50 accepts, from the operator, an input of instruction information (also referred to as operation command) including an instruction on a moving direction for the moving body device 100. When accepting the input of the instruction information from the operator, the control device 50 transmits the accepted instruction information to the moving body device 100. Note that the control device 50 includes a display unit (output unit) that displays auxiliary content corresponding to an auxiliary screen to assist an operation by the operator. For example, the control device 50 displays, as the auxiliary content, auxiliary content that causes the operator to visually recognize an image of a case where an operation command execution of which is intended by the operator is temporarily executed.

In the related art, the operator needs to give an instruction on a moving direction while considering a direction and posture of the moving body device 100 since the moving direction of the moving body device 100 depends on a direction and posture of a moving body device 10. For example, in the related art, in a case where the operator gives an instruction to the moving body device 100 to move forward, the moving body device 100 that receives the instruction moves in a front direction in which the moving body device 100 faces at that time. Thus, for example, there is a problem that the moving body device 100 moves in a direction not intended by the operator in a case where the direction or posture of the moving body device 100 is greatly changed due to a disturbance such as wind.

Also, in the related art, in a semi-automatic operation in which the operator gives an instruction to the moving body device 100 on a rough traveling direction and the moving body device 100 moves while avoiding an obstacle, when the moving body device 100 performs obstacle avoidance, the direction of the moving body device 100 is greatly changed. Thus, the operator needs to perform a complicated operation.

Thus, the moving body device 100 according to the embodiment of the present disclosure is an information processing device that moves according to instruction information including an instruction from the operator on a moving direction for the moving body device 100. The moving body device 100 acquires, from the control device 50, the instruction information including the instruction from the operator on the moving direction for the moving body device 100. Also, the moving body device 100 transforms the moving direction included in the acquired instruction information into a moving direction in a relative coordinate system based on a reference position, which is determined according to a surrounding environment of the moving body device 100, and a relative position of the moving body device 100. Then, the moving body device 100 controls the moving direction of the moving body device 100 on the basis of the transformed moving direction.

In such a manner, the moving body device 100 according to the embodiment of the present disclosure can move while considering the relative position with respect to the reference position. Thus, the moving body device 100 makes it possible to move the moving body device 100 in the direction intended by the operator even in a case where the direction or posture of the moving body device 100 is suddenly changed due to a disturbance such as wind. Also, the moving body device 100 makes it possible to easily give an instruction on the moving direction even in a case where the direction of the moving body device 100 operated by the semi-automatic operation is greatly changed by the obstacle avoidance.

From here, a flow of the information processing according to the embodiment of the present disclosure will be described with reference to FIG. 1. In the example illustrated in FIG. 1, the control device 50 accepts, from the operator U1, an input of instruction information CM1 including an instruction to move the moving body device 100 in a direction at 90 degrees to the right (in eastward direction). Also, the control device 50 accepts, from the operator U1, an input of the instruction information CM1 including an instruction to use, with a position of the control device 50 being the reference position, the relative coordinate system from the reference position as the coordinate system used for the operation of the moving body device 100. When accepting the input of the instruction information CM1, the control device 50 transmits the accepted instruction information CM1 to the moving body device 100.

The moving body device 100 receives the instruction information CM1 from the control device 50. The moving body device 100 acquires the instruction information CM1. When acquiring the instruction information CM1, the moving body device 100 executes processing for executing the instruction information CM1. Specifically, when acquiring the instruction information CM1, the moving body device 100 acquires absolute coordinates (15, 15) of a self-position Q1. Subsequently, the moving body device 100 acquires absolute coordinates of the reference position included in the instruction information CM1. For example, the moving body device 100 acquires absolute coordinates (5, 10) of the position of the control device 50 which position is designated as the reference position P1.

Subsequently, the moving body device 100 calculates relative coordinates of the self-position Q1 with respect to the reference position P1. For example, the moving body device 100 calculates the relative coordinates (10, 5) of the self-position Q1 with respect to the reference position P1 by subtracting the absolute coordinates (5, 10) of the reference position P1 from the acquired absolute coordinates (15, 15) of the self-position Q1.

Subsequently, after calculating the relative coordinates (10, 5) of the self-position Q1 with respect to the reference position P1, the moving body device 100 decides a relative coordinate system used for the operation. For example, the moving body device 100 decides the reference position P1 as the origin of the relative coordinate system used for the operation. Also, the moving body device 100 decides a direction from the reference position P1 toward the self-position Q1 as a Y-axis of the relative coordinate system. Also, the moving body device 100 decides, as an X-axis of the relative coordinate system, a direction in which a vector in the direction from the reference position P1 toward the self-position Q1 is rotated clockwise by 90 degrees. In FIG. 1, the X-axis of the relative coordinate system which axis is decided by the moving body device 100 is indicated by X1'. Also, the Y-axis of the relative coordinate system which axis is decided by the moving body device 100 is indicated by Y1'.

Subsequently, when deciding the relative coordinate system used for the operation, the moving body device 100 transforms the moving direction included in the acquired instruction information CM1 into a moving direction in the decided relative coordinate system. For example, when being indicated by a vector, a moving direction in which the moving body device 100 is moved in the direction at 90 degrees to the right (in eastward direction) becomes a direction of a vector D1 in FIG. 1 in the absolute coordinate system. At this time, the moving body device 100 transforms the vector D1 indicating the moving direction in the absolute coordinate system into a vector D1' indicating the moving direction in the decided relative coordinate system.

For example, when it is assumed that an angle formed by a Y1-axis of the absolute coordinate system and a Y1'-axis of the relative coordinate system illustrated in FIG. 1 is $\theta$, transformation from an X1-Y1 coordinate system (absolute coordinate system) to an X1'-Y1' coordinate system (relative coordinate system) is indicated by a 2×2 matrix M indicating a rotational transformation in which a two-dimensional vector is rotated clockwise by the angle $\theta$. The moving body device 100 transforms the vector D1 into the vector D1' indicating the moving direction in the relative coordinate system by performing the rotational transformation of performing clockwise rotation by the angle $\theta$ on the vector D1. For example, by calculating the product of the matrix M and the vector D1, the moving body device 100 calculates the vector D1' indicating the moving direction in the relative coordinate system.

Subsequently, after transforming the moving direction in the absolute coordinate system into the moving direction in the decided relative coordinate system, the moving body device 100 controls the moving direction of the moving body device 100 on the basis of the transformed moving direction. For example, the moving body device 100 controls the movement of the moving body device 100 in such a manner that the moving body device 100 is caused to move in a direction of the vector D1' indicating the moving direction in the relative coordinate system.

As described above, the moving body device 100 acquires the instruction information including the instruction from the operator on the moving direction for the moving body device 100. Also, the moving body device 100 transforms the moving direction included in the acquired instruction information into the moving direction in the relative coordinate system based on the reference position, which is determined according to the surrounding environment of the moving body device 100 (presence of the operator U1 in FIG. 1), and the relative position of the moving body device 100. Then, the moving body device 100 controls the moving direction of the moving body device 100 on the basis of the transformed moving direction.

In such a manner, the moving body device 100 according to the embodiment of the present disclosure can move while considering the relative position with respect to the reference position. Thus, the moving body device 100 makes it possible to move the moving body device 100 in the direction intended by the operator even in a case where the direction or posture of the moving body device 100 is suddenly changed due to a disturbance such as wind. Also, the moving body device 100 makes it possible to easily give an instruction on the moving direction even in a case where the direction of the moving body device 100 operated by the semi-automatic operation is greatly changed by the obstacle avoidance. Thus, the moving body device 100 can appropriately control the moving direction of the moving body.

Note that an example in which the moving body device 100 acquires the absolute coordinates of the position of the control device 50, which position is designated as the reference position P1, and the absolute coordinates of the self-position Q1 of the moving body device 100 has been described in the example illustrated in FIG. 1. However, the absolute coordinates of the reference position P1 and the absolute coordinates of the self-position Q1 are not necessarily required. Specifically, by using an infrared sensor or the like, the moving body device 100 may directly acquire the relative position of the moving body device 100 with respect to the position of the control device 50.

1-3. Configuration of Moving Body Device According to the Embodiment

Figure 3:
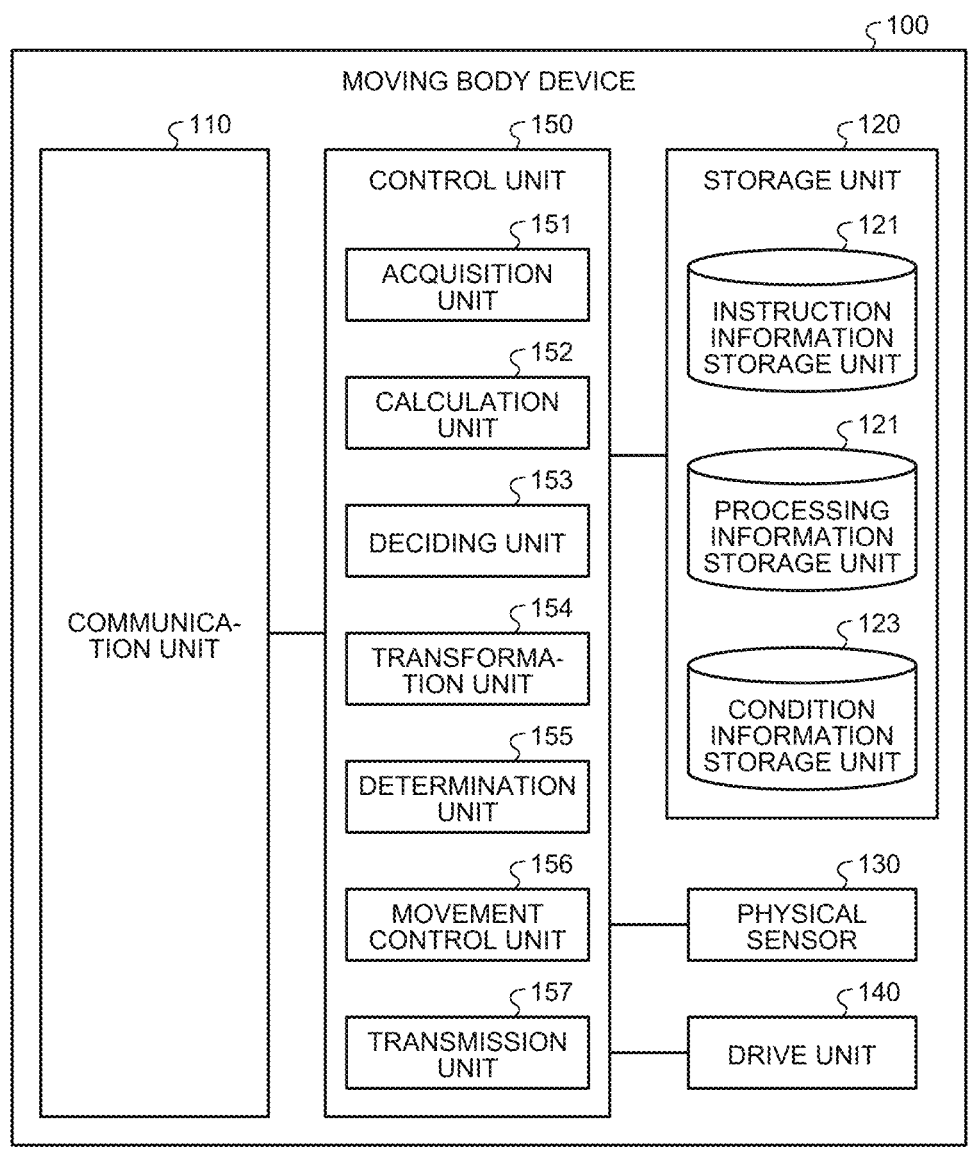
FIG. 3 is a view illustrating a configuration example of a moving body device according to the embodiment of the present disclosure.

Next, a configuration of the moving body device according to the embodiment of the present disclosure will be described with reference to FIG. 3. FIG. 3 is a view illustrating a configuration example of the moving body device according to the embodiment of the present disclosure. As illustrated in FIG. 3, the moving body device 100 includes a communication unit 110, a storage unit 120, a physical sensor 130, a drive unit 140, and a control unit 150.

1-3-1. Configuration of Communication Unit According to the Embodiment

The communication unit 110 is realized, for example, by a network interface card (NIC) or the like. Then, the communication unit 110 is connected to the network N in a wired or wireless manner, and transmits/receives information to/from the control device 50 and the terminal device 10.

1-3-2. Configuration of Storage Unit According to the Embodiment

The storage unit 120 is realized by a semiconductor memory element such as a random access memory (RAM) or a flash memory, or a storage device such as a hard disk or an optical disk, for example. For example, the storage unit 120 stores an information processing program according to the embodiment. As illustrated in FIG. 3, the storage unit 120 includes an instruction information storage unit 121, a processing information storage unit 122, and a condition information storage unit 123.

1-3-2-1. Configuration of Instruction Information Storage Unit According to the Embodiment The instruction information storage unit 121 stores various kinds of information related to an instruction for the moving body device 100 from the operator. FIG. 4 is a view illustrating an example of the instruction information storage unit according to the embodiment of the present disclosure. In the example illustrated in FIG. 4, the instruction information storage unit 121 has items such as an "instruction information ID", a "date and time", a "moving direction", a "coordinate system", and a "reference position".

The "instruction information ID" indicates identification information for identifying instruction information. The "date and time" indicates a receiving date and time of the instruction information. The "moving direction" indicates a moving direction of the moving body device 100. The "coordinate system" indicates a kind of a coordinate system used for an operation of the moving body device 100. The "reference position" corresponds to a position of the origin of the coordinate system used for the operation of the moving body device 100.

In the example illustrated in FIG. 4, instruction information identified by an instruction information ID "CM1" (instruction information CM1) corresponds to instruction information for the moving body device 100 from the operator illustrated in FIG. 1. Also, a date and time "DT1" indicates a receiving date and time of the instruction information CM1. Also, a moving direction "move forward at 90 degrees to the right" indicates that the moving direction of the moving body device 100 is the direction at 90 degrees to the right (eastward direction). Also, a coordinate system "relative coordinate system" indicates that the kind of the coordinate system used for the operation of the moving body device 100 is the relative coordinate system. Also, a reference position "position of the control device 50" indicates that the position of the origin of the coordinate system used for the operation of the moving body device 100 is the position of the control device 50.

1-3-2-2. Configuration of Processing Information Storage Unit According to the Embodiment The processing information storage unit 122 stores various kinds of information to be processed by the moving body device 100 according to the instruction information. FIG. 5 is a view illustrating an example of the processing information storage unit according to the embodiment of the present disclosure. In the example illustrated in FIG. 5, the processing information storage unit 122 has items such as a "processing information ID", a "date and time", "reference position coordinates", "self-position coordinates", and "relative position coordinates".

The "processing information ID" indicates identification information for identifying processing information. The "date and time" indicates a date and time when the moving body device 100 starts processing according to the instruction information. The "reference position coordinates" indicate absolute coordinates of the reference position. The "self-position coordinates" indicate absolute coordinates of the position of the moving body device 100. The "relative position coordinates" indicate coordinates of a relative position of the moving body device 100 with respect to the reference position.

In the example illustrated in FIG. 5, processing information identified by a processing information ID "PS1" (processing information PS1) corresponds to processing information processed by the moving body device 100 illustrated in FIG. 1. Also, a date and time "DT1" indicates a date and time when the moving body device 100 starts the processing of the processing information PS1. Also, the reference position coordinates "(5, 10)" indicate that the absolute coordinates of the reference position are (5, 10). Also, the self-position coordinates "(15, 15)" indicate that the absolute coordinates of the position of the moving body device 100 are (15, 15). Also, the relative position coordinates "(10, 5)" indicate that the coordinates of the relative position of the moving body device 100 with respect to the reference position are (10, 5).

1-3-2-3. Configuration of Condition Information Storage Unit According to the Embodiment The condition information storage unit 123 stores various kinds of information related to a change condition of the coordinate system used for the operation of the moving body device 100. FIG. 6 is a view illustrating an example of the condition information storage unit according to the embodiment of the present disclosure. In the example illustrated in FIG. 6, the condition information storage unit 123 is identification information to identify a "condition information ID" and information. Items such as a "sensor information type", "condition information", and a "threshold" are included.

The "condition information ID" indicates identification information for identifying condition information. The "sensor information type" indicates a type of sensor information used for the change condition of the coordinate system used for the operation of the moving body device 100. The "condition information" indicates the change condition of the coordinate system used for the operation of the moving body device 100. The "threshold" is a threshold of the sensor information used for the change condition of the coordinate system used for the operation of the moving body device 100, and indicates a threshold related to the change condition.

1-3-3. Configuration of Physical Sensor According to the Embodiment

The physical sensor 130 is a sensor that detects predetermined information. Specifically, the physical sensor 130 has a function of an image sensor (camera) as an imaging means to capture an image, and detects image information. Also, the physical sensor 130 has a function of a sound sensor (microphone) as a means to acquire sound, and detects sound information. Also, the physical sensor 130 has a function of a light sensor or an illuminance sensor as a means to detect a light source, and detects the light source. Also, the physical sensor 130 has a function of a pressure sensor to detect water pressure or air pressure, and detects the water pressure or the air pressure. Also, the physical sensor 130 has a function of a temperature sensor to detect temperature, and detects a temperature of an operation target. Also, the physical sensor 130 has a function of a wind pressure sensor to detect wind pressure, and detects the wind pressure. Also, the physical sensor 130 has a function of a vibration sensor to detect a vibration of the moving body device 100, and detects the vibration of the moving body device 100.

Note that the physical sensor 130 may have functions of various sensors such as an acceleration sensor, a gyroscope sensor, a humidity sensor, a proximity sensor, and a sensor to acquire biological information such as a smell, sweat, heartbeat, a pulse, and brain waves.

Also, the physical sensor 130 has a function of a ranging sensor, and detects a distance between an object to be measured and the moving body device 100. The physical sensor 130 has the function of the ranging sensor, and detects distance information between the object to be measured and the moving body device 100. Specifically, the physical sensor 130 includes an optical sensor as the function of the ranging sensor. For example, the physical sensor 130 may include a LiDAR. The LiDAR detects a distance and a relative speed to a surrounding object by emitting a laser beam of an infrared laser or the like to the surrounding object and measuring a time until the laser beam is reflected and returns. The physical sensor 130 may include a ranging sensor using a millimeter-wave radar. Note that the ranging sensor is not limited to the LiDAR, and the physical sensor 130 may include various sensors such as a ToF sensor and a stereo camera as ranging sensors.

Also, it is assumed that the physical sensor 130 has a function of a sensor to detect a position (position sensor), such as a global positioning system (GPS) sensor, and can detect the position and acquire positional information.

1-3-4. Configuration of Drive Unit According to the Embodiment

The drive unit 140 has a function of driving a physical configuration in the moving body device 100. The drive unit 140 has a function to move the position of the moving body device 100. The drive unit 140 is, for example, an actuator. Note that the drive unit 140 may have any configuration as long as the moving body device 100 can realize a desired operation. The drive unit 140 may have any configuration as long as movement of the position of the moving body device 100, and the like can be realized. In a case where the moving body device 100 includes a moving mechanism such as a caterpillar or a tire, the drive unit 140 drives the caterpillar, the tire, or the like. For example, by driving the moving mechanism of the moving body device 100 in response to an instruction from the movement control unit 156, the drive unit 140 moves the moving body device 100 and changes the position of the moving body device 100.

1-3-5. Configuration of Control Unit According to the Embodiment

The control unit 150 is realized when various programs (corresponding to an example of the information processing program) stored in the storage device inside the moving body device 100 are executed with a RAM as a work area by a central processing unit (CPU), a micro processing unit (MPU), or the like. Also, the control unit 150 is realized by, for example, an integrated circuit such as an application specific integrated circuit (ASIC) or a field programmable gate array (FPGA).

As illustrated in FIG. 3, the control unit 150 includes an acquisition unit 151, a calculation unit 152, a deciding unit 153, a transformation unit 154, a determination unit 155, a movement control unit 156, and a transmission unit 157, and realizes or executes a function and an action of information processing described below. Note that an internal configuration of the control unit 150 is not limited to the configuration illustrated in FIG. 3, and may be another configuration as long as being a configuration of performing information processing described later.

The acquisition unit 151 acquires instruction information including an instruction from the operator on a moving direction for the moving body. Specifically, the acquisition unit 151 receives the instruction information from the control device 50. The acquisition unit 151 acquires the received instruction information. When acquiring the instruction information, the acquisition unit 151 stores the acquired instruction information into the instruction information storage unit 121.

Also, when acquiring the instruction information, the acquisition unit 151 executes processing to execute the instruction information. Specifically, when acquiring the instruction information, the acquisition unit 151 acquires absolute coordinates of a position of the moving body (hereinafter, also referred to as moving body position). For example, the acquisition unit 151 acquires GPS coordinates of the moving body position as the absolute coordinates by a GPS sensor. Subsequently, the acquisition unit 151 acquires absolute coordinates of a reference position included in the instruction information. For example, the acquisition unit 151 acquires absolute coordinates of a position of the control device 50 which position is designated as the reference position. For example, the acquisition unit 151 acquires GPS coordinates of the reference position as the absolute coordinates by the GPS sensor. When acquiring the absolute coordinates of the reference position and the absolute coordinates of the moving body position, the acquisition unit 151 stores the acquired absolute coordinates of the reference position and absolute coordinates of the moving body position into the processing information storage unit 122.

The calculation unit 152 calculates relative position coordinates of the moving body position with respect to the reference position. Specifically, when the absolute coordinates of the reference position and the absolute coordinates of the moving body position are acquired by the acquisition unit 151, the calculation unit 152 calculates the relative position coordinates of the moving body position with respect to the reference position by subtracting the absolute coordinates of the reference position, which coordinates are acquired by the acquisition unit 151, from the absolute coordinates of the moving body position which coordinates are acquired by the acquisition unit 151. After calculating the relative position coordinates of the moving body position with respect to the reference position, the calculation unit 152 stores the calculated relative position coordinates into the processing information storage unit 122.

The deciding unit 153 decides a relative coordinate system used for the operation. Specifically, when the relative coordinates of the moving body position with respect to the reference position are calculated by the calculation unit 152, the deciding unit 153 decides, as a Y-axis of the relative coordinate system, a direction from the reference position toward the moving body position. Also, the deciding unit 153 decides, as an X-axis of the relative coordinate system, a direction in which a vector in the direction from the reference position toward the moving body position is rotated clockwise by 90 degrees. Also, the deciding unit 153 decides the reference position as the origin of the relative coordinate system used for the operation.

The transformation unit 154 transforms a moving direction included in the instruction information acquired by the acquisition unit 151 into a moving direction in the relative coordinate system based on the reference position, which is a position of the operator, and the relative position of the moving body. For example, when it is assumed that an angle formed by a Y-axis of the absolute coordinate system and a Y'-axis of the relative coordinate system is θ, a transformation from an X-Y coordinate system (absolute coordinate system) into an X'-Y' coordinate system (relative coordinate system) is indicated by a 2×2 matrix M indicating a rotational transformation in which a two-dimensional vector is rotated clockwise by the angle θ. At this time, the transformation unit 154 transforms the vector D1 indicating the moving direction in the absolute coordinate system into the vector D1' indicating the moving direction in the relative coordinate system by performing the rotational transformation of performing clockwise rotation by the angle θ on the vector D1 indicating the moving direction in the absolute coordinate system. For example, the transformation unit 154 transforms the vector D1 into the vector D1' by calculating the product of the matrix M and the vector D1. In such a manner, when the relative coordinate system used for the operation is decided by the deciding unit 153, the transformation unit 154 transforms the moving direction included in the instruction information acquired by the acquisition unit 151 (vector D1) into the moving direction in the relative coordinate system decided by the deciding unit 153 (vector D1').

In such a manner, the transformation unit 154 transforms the moving direction included in the instruction information acquired by the acquisition unit 151 (vector D1) into the moving direction in the relative coordinate system based on the reference position determined according to a surrounding environment (operator) of the moving body (position of the control device 50) and the relative position of the moving body (vector D1').

The determination unit 155 determines whether environmental information related to the surrounding environment of the moving body satisfies a predetermined condition. Specifically, the determination unit 155 determines whether the environmental information related to the surrounding environment (operator) of the moving body (instruction information for the moving body from the operator) satisfies the predetermined condition. For example, the determination unit 155 determines whether the instruction information for the moving body from the operator is changed. For example, the determination unit 155 determines whether at least one of the moving direction of the moving body, the reference position, or the coordinate system used for the operation, these being included in the instruction information, is changed.

In a case where the determination unit 155 determines that the environmental information satisfies the predetermined condition, the transformation unit 154 changes the reference position to a reference position corresponding to the predetermined condition, and transforms the moving direction included in the instruction information acquired by the acquisition unit 151 into the moving direction in the relative coordinate system based on the changed reference position and the relative position of the moving body. For example, in a case where the determination unit 155 determines that at least one of the moving direction of the moving body, the reference position, or the coordinate system used for the operation, these being included in the instruction information, is changed, the transformation unit 154 changes the reference position to a reference position corresponding to the changed instruction information. Subsequently, the transformation unit 154 transforms the moving direction included in the instruction information acquired by the acquisition unit 151 into the moving direction in the relative coordinate system based on the changed reference position and the relative position of the moving body.

The movement control unit 156 controls the moving direction of the moving body on the basis of the moving direction transformed by the transformation unit 154. When the moving direction is transformed by the transformation unit 154, the movement control unit 156 controls the moving direction of the moving body on the basis of the moving direction transformed by the transformation unit 154. Specifically, the movement control unit 156 controls the movement of the moving body in such a manner that the moving body is moved in the direction of the vector D1' indicating the moving direction in the relative coordinate system.

The transmission unit 157 transmits various kinds of information to the control device 50. For example, the transmission unit 157 transmits the absolute coordinates of the reference position and the absolute coordinates of the moving body position which coordinates are acquired by the acquisition unit 151. Also, the transmission unit 157 transmits the relative position coordinates of the moving body position with respect to the reference position which coordinates are calculated by the calculation unit 152. Also, the transmission unit 157 transmits information related to the relative coordinate system decided by the deciding unit 153 and used for the operation.

1-4. Procedure of Information Processing According to the Embodiment

Next, a flow of the information processing according to the embodiment of the present disclosure will be described with reference to FIG. 7. FIG. 7 is a flowchart illustrating the procedure of the information processing according to the embodiment of the present disclosure.

As illustrated in FIG. 7, the moving body device 100 acquires instruction information including an instruction on a moving direction (Step S101). Subsequently, when acquiring the instruction information, the moving body device 100 decides a relative coordinate system on the basis of a relative position of the moving body with respect to a reference position (Step S102). Subsequently, when deciding the relative coordinate system, the moving body device 100 transforms the moving direction included in the instruction information into a moving direction of the relative coordinate system (Step S103). Subsequently, after transforming the moving direction into the moving direction of the relative coordinate system, the moving body device 100 controls the moving direction of the moving body on the basis of the transformed moving direction (Step S104).

1-5. Configuration of Control Device According to the Embodiment

Figure 8:
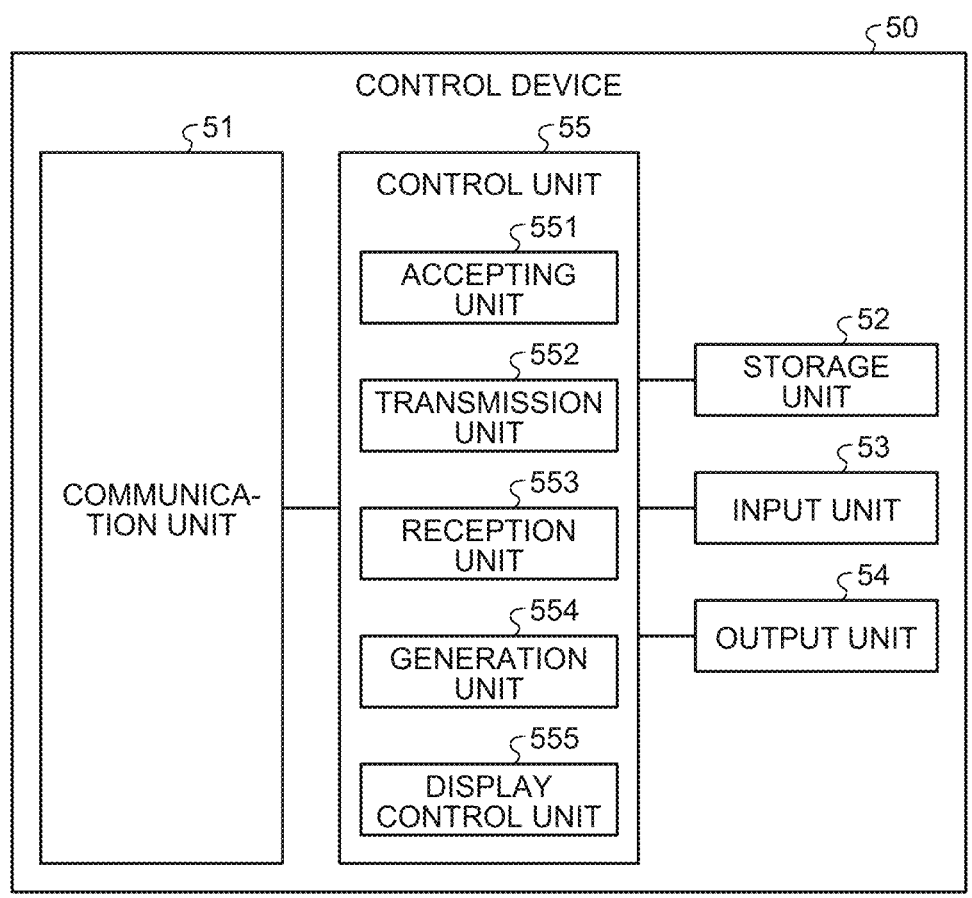
FIG. 8 is a view illustrating an example of information processing according to a first modification example of the present disclosure.

Next, a configuration of the control device according to the embodiment of the present disclosure will be described with reference to FIG. 8. FIG. 8 is a view illustrating a configuration example of the control device according to the embodiment of the present disclosure.

As illustrated in FIG. 8, the control device 50 includes a communication unit 51, a storage unit 52, an input unit 53, an output unit 54, and a control unit 55.

The communication unit 51 is realized, for example, by a NIC or the like. Then, the communication unit 51 is connected to the network N in a wired or wireless manner, and transmits/receives information to/from an external information processing device such as the moving body device 100 or the terminal device 10.

The storage unit 52 is realized, for example, by a semiconductor memory element such as a RAM or a flash memory, or a storage device such as a hard disk or an optical disk. For example, the storage unit 52 stores information acquired from the external information processing device such as the moving body device 100 or the terminal device 10. Also, the storage unit 52 stores instruction information accepted by an accepting unit 551. Also, the storage unit 52 stores processing information received by a reception unit 553. Also, the storage unit 52 stores content generated by a generation unit 554.

The input unit 53 is an input device that accepts various operations from the operator. Specifically, the input unit 53 accepts an input operation of instruction information (also referred to as operation command) including an instruction from the operator on the moving direction for the moving body device 100. For example, the input unit 53 is realized by a keyboard, a mouse, an operation key, or the like.

The output unit 54 is a display device to display various kinds of information. For example, the output unit 54 is realized by a liquid-crystal display or the like. Note that the input unit 53 and the output unit 54 are integrated in a case where a touch panel is employed as the control device 50.

The output unit 54 displays the content generated by the generation unit 554. For example, the output unit 54 displays auxiliary content that is the content generated by the generation unit 554 and that corresponds to the auxiliary screen to assist the operation by the operator. For example, the output unit 54 displays, as the auxiliary content, auxiliary content that causes the operator to visually recognize an image of a case where the operation command intended to be executed by the operator is temporarily executed. For example, the output unit 54 displays auxiliary content corresponding to a screen in a temporary execution mode illustrated in FIG. 23 (described later).

The control unit 55 is realized when various programs (corresponding to an example of the information processing program) stored in the storage device inside the control device 50 are executed by a CPU, an MPU, or the like with a RAM as a work area. Also, the control unit 55 is realized, for example, by an integrated circuit such as an ASIC or an FPGA.

As illustrated in FIG. 8, the control unit 55 includes the accepting unit 551, a transmission unit 552, the reception unit 553, and a display control unit 554, and realizes or executes a function and an action of information processing described below. Note that an internal configuration of the control unit 55 is not limited to the configuration illustrated in FIG. 8, and may be another configuration as long as being a configuration of performing information processing described later.

The accepting unit 551 accepts instruction information (also referred to as operation command) input via the input unit 52. When accepting the instruction information, the accepting unit 551 stores the accepted instruction information into the storage unit 52.

The transmission unit 552 transmits various kinds of information to the moving body device 100. For example, the transmission unit 552 transmits the instruction information accepted by the accepting unit 551 to the moving body device 100.

The reception unit 553 receives various kinds of information from the moving body device 100. For example, the reception unit 553 acquires processing information from the moving body device 100. For example, the reception unit 553 receives absolute coordinates of the reference position and absolute coordinates of the moving body position. Also, the reception unit 553 receives relative position coordinates of the moving body position with respect to the reference position. Also, the transmission unit 157 receives information related to the relative coordinate system used for the operation.

The generation unit 554 generates the auxiliary content corresponding to the auxiliary screen to assist the operation by the operator. Specifically, the generation unit 554 refers to the storage unit 52 and acquires the instruction information and the processing information. Subsequently, the generation unit 554 generates, on the basis of the acquired instruction information and processing information, auxiliary content causing the operator to visually recognize an image of a case where the operation command intended to be executed by the operator is temporarily executed. For example, the generation unit 554 generates auxiliary content corresponding to a simulation image of a case where the moving direction of the moving body is controlled on the basis of the moving direction acquired by a transformation of the moving direction of the moving body, which direction is instructed by the operator, into the moving direction in the relative coordinate system based on the reference position, which is determined according to the surrounding environment of the moving body, and the relative position of the moving body. When generating the auxiliary content, the generation unit 554 stores the generated auxiliary content into the storage unit 52.

A display control unit 555 outputs the auxiliary content generated by the generation unit 554 to the output unit 54. Specifically, the display control unit 555 displays, in a manner visible to the operator, the simulation image of a case where the moving direction of the moving body is controlled on the basis of the moving direction acquired by the transformation of the moving direction of the moving body, which direction is instructed by the operator, into the moving direction in the relative coordinate system based on the reference position, which is determined according to the surrounding environment of the moving body, and the relative position of the moving body. For example, the display control unit 555 displays, on the output unit 54, the auxiliary content corresponding to the screen in the temporary execution mode illustrated in FIG. 23 (described later).

1-6. Modification Example of the Embodiment

Next, various kinds of information processing according to modification examples of the present disclosure will be described with reference to FIG. 9 to FIG. 22. Note that, in the examples illustrated in FIG. 9 to FIG. 22, an operator U1 operates, by using a control device 50, a moving body device 100 that is a robot capable of autonomously moving (for example, flying) in the air (such as drone). The moving body device 100 moves on a two-dimensional plane in response to an instruction from the operator U1. Also, the moving body device 100 includes an image sensor such as a camera, and photographs an object to be photographed.

1-6-1. First Modification Example of the Embodiment

First, an outline of information processing according to the first modification example of the present disclosure will be described with reference to FIG. 9. FIG. 9 is a view illustrating an example of the information processing according to the first modification example of the present disclosure. In FIG. 9, the moving body device 100 moves while tracking a bird O2 to be photographed. Specifically, a predetermined relative position from a position of the bird O2 is set as a reference position P2. In response to a movement of the bird O2, the reference position P2 moves while maintaining the relative position from the bird O2. Then, the moving body device 100 moves in a direction of becoming away from the reference position P2 while maintaining a relative direction from the reference position P2 toward the moving body device 100.

In the example illustrated in FIG. 9, a control device 50 accepts, from the operator U1, an input of instruction information CM2 including an instruction to move the moving body device 100 forward (in northward direction). Also, from the operator U1, the control device 50 accepts an input of instruction information CM2 including an instruction to use, as a coordinate system used for the operation of the moving body device 100, a relative coordinate system from a reference position P2 with a predetermined relative position from the position of the bird O2 to be photographed being the reference position P2. Specifically, the control device 50 accepts, as the information indicating the reference position, an input of the instruction information CM2 including identification information "O2" for identifying the bird to be photographed, and a relative position vector Δ (such as (5, 0)) indicating the predetermined relative position from the position of the bird O2 identified by the identification information "O2". When accepting the input of the instruction information CM2, the control device 50 transmits the accepted instruction information CM2 to the moving body device 100.

A transformation unit 154 transforms a moving direction included in instruction information acquired by an acquisition unit 151 into a moving direction in the relative coordinate system based on the reference position, which is located at the predetermined relative position from the position of the operation target of the moving body, and a relative position of the moving body.

The acquisition unit 151 receives the instruction information CM2 from the control device 50. The acquisition unit 151 acquires the instruction information CM2. When acquiring the instruction information CM2, the acquisition unit 151 executes processing to execute the instruction information CM2. Specifically, when acquiring the instruction information CM2, the acquisition unit 151 acquires absolute coordinates (17, 17) of a self-position Q2. Subsequently, the acquisition unit 151 detects a bird to be photographed by, for example, image recognition. Subsequently, when detecting the bird to be photographed, the acquisition unit 151 identifies the bird by the identification information "O2". Subsequently, on the basis of an image acquired by an image sensor such as a camera, the acquisition unit 151 acquires absolute coordinates (10, 10) of a position R2 of the bird O2 identified by the identification information "O2".

When the absolute coordinates (10, 10) of the position R2 of the bird O2 are acquired by the acquisition unit 151, a calculation unit 152 calculates absolute coordinates (15, 10) of the reference position P2 by adding the relative position vector Δ (5, 0) included in the instruction information CM2 to the absolute coordinates (10, 10) of the position R2 of the bird O2.

Subsequently, after calculating the absolute coordinates (15, 10) of the reference position P2, the calculation unit 152 calculates relative coordinates of the self-position Q2 with respect to the reference position P2. For example, the calculation unit 152 calculates the relative coordinates (2, 7) of the self-position Q2 with respect to the reference position P2 by subtracting the absolute coordinates (15, 10) of the reference position P2 from the absolute coordinates (17, 17) of the self-position Q2 which coordinates are acquired by the acquisition unit 151.

Subsequently, after the relative coordinates (2, 7) of the self-position Q2 with respect to the reference position P2 are calculated, the deciding unit 153 decides a relative coordinate system C2 used for an operation. For example, the deciding unit 153 decides the reference position P2 as the origin of the relative coordinate system C2 used for the operation. Also, the moving body device 100 decides a direction from the reference position P2 toward the self-position Q2 as a Y-axis of the relative coordinate system C2. Also, the moving body device 100 decides, as an X-axis of the relative coordinate system C2, a direction in which a vector in the direction from the reference position P2 toward the self-position Q2 is rotated clockwise by 90 degrees.

Subsequently, when the relative coordinate system C2 used for the operation is decided by the deciding unit 153, the transformation unit 154 transforms a moving direction D2 (not illustrated) included in the instruction information CM2 acquired by the acquisition unit 151 into a moving direction D2' in the relative coordinate system C2 decided by the deciding unit 153. For example, when a moving direction in which the moving body device 100 is moved forward (in northward direction) is indicated by a vector D2 (not illustrated), the transformation unit 154 transforms the vector D2 indicating the moving direction in the absolute coordinate system C2 into a vector D2' indicating a moving direction in the decided relative coordinate system C2.

In such a manner, the transformation unit 154 transforms the moving direction included in the instruction information acquired by the acquisition unit 151 (moving direction D2) into the moving direction in the relative coordinate system (relative coordinate system C2) based on the reference position (reference position P2) located at the predetermined relative position (relative position vector Δ) from the position of the operation target of the moving body (position R of the bird O2 to be photographed) and the relative position of the moving body (moving direction D2').

For example, when it is assumed that an angle formed by a Y-axis of the absolute coordinate system and a Y'-axis of the relative coordinate system C2 is θ, a transformation from an X-Y coordinate system (absolute coordinate system) into an X'-Y' coordinate system (relative coordinate system) is indicated by a 2×2 matrix M indicating a rotational transformation in which a two-dimensional vector is rotated clockwise by the angle θ. The transformation unit 154 transforms the vector D2 into the vector D2' indicating the moving direction in the relative coordinate system C2 by performing the rotational transformation of performing clockwise rotation by the angle θ on the vector D2. For example, by calculating the product of the matrix M and the vector D2, the transformation unit 154 calculates the vector D2' indicating the moving direction in the relative coordinate system C2.

Subsequently, when the moving direction D2 in the absolute coordinate system is transformed into the moving direction D2' in the decided relative coordinate system C2, a movement control unit 156 controls the moving direction of the moving body device 100 on the basis of the transformed moving direction D2'. For example, the movement control unit 156 controls the movement of the moving body device 100 in such a manner that the moving body device 100 is moved in the direction of the vector D2' indicating the moving direction in the relative coordinate system C2.

1-6-2. Second Modification Example of the Embodiment

Figure 10:
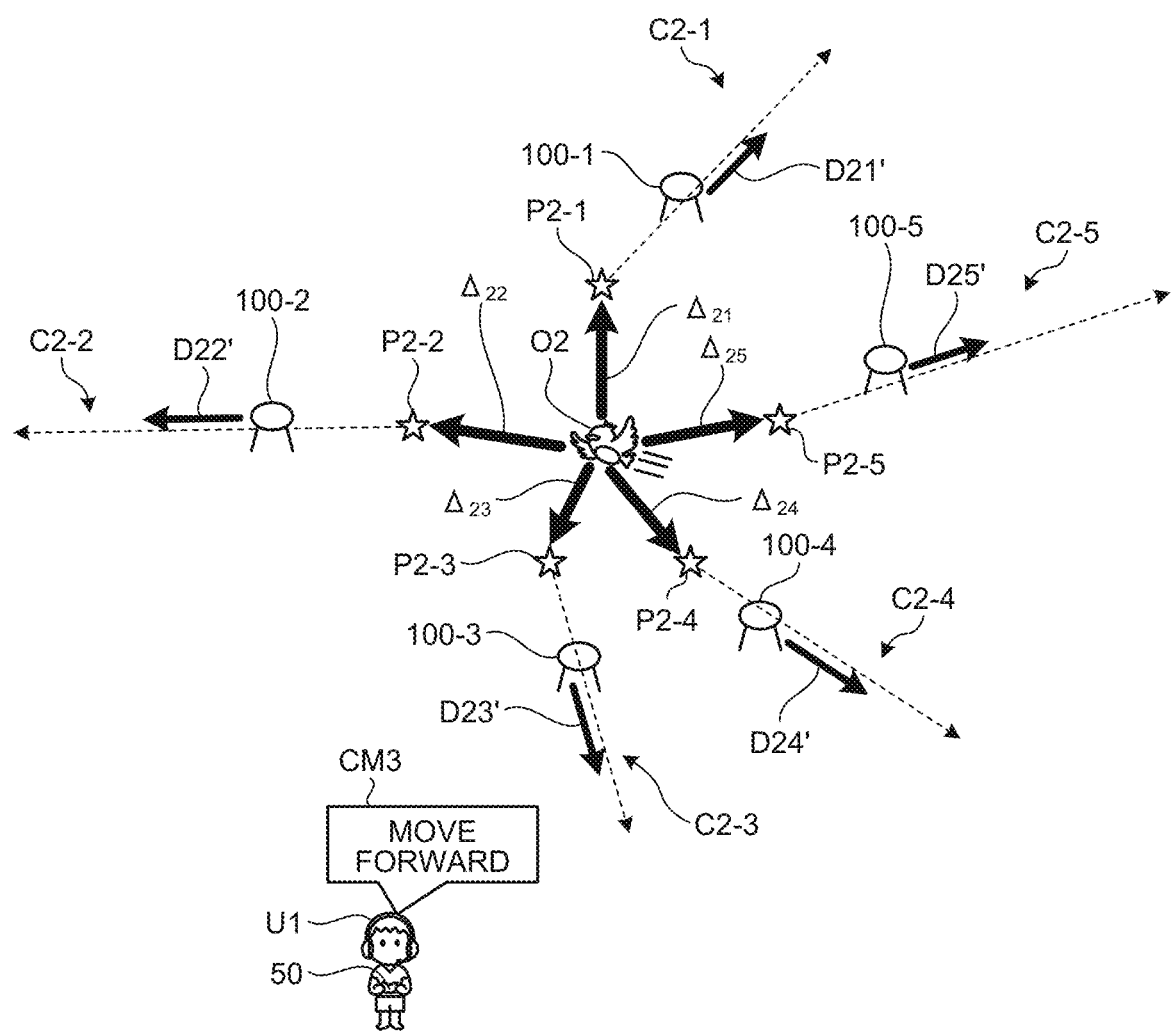
FIG. 10 is a view illustrating an example of information processing according to a third modification example of the present disclosure.

Next, an outline of information processing according to the second modification example of the present disclosure will be described with reference to FIG. 10. FIG. 10 is a view illustrating an example of the information processing according to the second modification example of the present disclosure. In FIG. 9, an example in which one moving body device 100 moves while tracking the bird O2 to be photographed has been described. In FIG. 10, each of five moving body devices 100-1 to 100-5 moves while tracking a bird O2 to be photographed. Specifically, reference positions P2-1 to P2-5 that are predetermined relative positions from a position of the bird O2 are respectively arranged at relative positions corresponding to vertexes of a pentagon surrounding the position of the bird O2 as viewed from the bird O2. Also, in response to the movement of the bird O2, each of the reference positions P2-1 to P2-5 moves while maintaining the relative position from the bird O2. Then, the moving body devices 100-1 to 100-5 move in directions of becoming away from the reference positions P2-1 to P2-5 while maintaining relative directions from the reference positions P2-1 to P2-5 toward the moving body devices 100-1 to 100-5, respectively.

In the example illustrated in FIG. 10, a control device 50 accepts individual instruction information CM3-1 to CM3-5 from an operator U1 respectively for the moving body devices 100-1 to 100-5. Specifically, the control device 50 accepts, from the operator U1, an input of instruction information including an instruction to move the moving body devices 100-1 to 100-5 forward (in northward direction). Also, from the operator U1, the control device 50 accepts an input of the instruction information CM3-1 to CM3-5 including instructions to use, as coordinate systems used for the operation of the moving body devices 100-1 to 100-5, relative coordinate systems from the reference positions P2-1 to P2-5 with the predetermined relative positions from the position of the bird O2 to be photographed being the reference positions P2-1 to P2-5. Specifically, the control device 50 accepts, as the information indicating the reference positions, an input of the instruction information CM3-1 to CM3-5 including identification information "O2" for identifying the bird to be photographed and relative position vectors $\Delta_{21}$ to $\Delta_{25}$ respectively indicating the predetermined relative positions from the position of the bird O2 identified by the identification information "O2". When accepting the input of the instruction information CM3-1 to CM3-5, the control device 50 transmits the accepted instruction information CM3-1 to CM3-5 to moving body devices 100. In such a manner, the coordinate systems, the reference positions, and the predetermined relative positions individually used for the operation may be respectively transmitted from the control device 50 to the moving body devices 100-1 to 100-5.

In FIG. 10, the transformation unit 154 transforms moving directions (moving directions D21 to D25 (not illustrated)) included in the instruction information acquired by the acquisition unit 151 (instruction information CM3-1 to CM3-5) into moving directions (moving directions D21' to D25') in relative coordinate systems (relative coordinate systems C2-1 to C2-5) based on reference positions (reference positions P2-1 to P2-5) located at the predetermined relative positions (relative position vectors $\Delta_{21}$ to $\Delta_{23}$) from the position of the operation target of the moving bodies (moving body devices 100-1 to 100-5) (position R of the bird O2 to be photographed) and the relative positions of the moving bodies.

1-6-3. Third Modification Example of the Embodiment

Next, an outline of information processing according to the third modification example of the present disclosure will be described with reference to FIG. 11. FIG. 11 is a view illustrating an example of the information processing according to the third modification example of the present disclosure. In FIG. 10, an example in which each of the five moving body devices 100-1 to 100-5 moves while tracking the bird O2 to be photographed has been described. In FIG. 11, in addition to five moving body devices 100-1 to 100-5 illustrated in the left side of FIG. 11, each of five more moving body devices 100-6 to 100-10 moves while tracking a bird O3 to be photographed (photographed object different from a bird 2) as illustrated in the right side of FIG. 11. Specifically, in addition to FIG. 10, reference positions P3-1 to P3-5 that are predetermined relative positions from a position of the bird O3 are respectively arranged at relative positions corresponding to vertexes of a pentagon surrounding the position of the bird O3 as viewed from the bird O3. Also, in response to the movement of the bird O3, each of the reference positions P3-1 to P3-5 moves while maintaining the relative position from the bird O3. Then, the moving body devices 100-6 to 100-10 move in directions of becoming away from the reference positions P3-1 to P3-5 while maintaining relative directions from the reference positions P3-1 to P3-5 toward the moving body devices 100-6 to 100-10, respectively.

In the example illustrated in FIG. 11, a control device 50 accepts individual instruction information CM3-1 to CM3-10 from an operator U1 respectively for the moving body devices 100-1 to 100-10. Specifically, the control device 50 accepts, from the operator U1, the instruction information CM3-1 to CM3-5 similar to that in FIG. 10 for the moving body devices 100-1 to 100-10. Also, from the operator U1, the control device 50 accepts an input of the instruction information CM3-6 to CM3-10 including instructions to use, as coordinate systems used for the operation of the moving body devices 100-6 to 100-10, relative coordinate systems from the reference positions P3-1 to P3-5 with the predetermined relative positions from the position of the bird O3 to be photographed being the reference positions P3-1 to P3-5. Specifically, the control device 50 accepts, as the information indicating the reference positions, an input of the instruction information CM3-6 to CM3-10 including identification information "O3" for identifying the bird to be photographed and relative position vectors $\Delta_{31}$ to $\Delta_{33}$ respectively indicating the predetermined relative positions from the position of the bird O3 identified by the identification information "O3". When accepting the input of the instruction information, the control device 50 transmits the accepted instruction information CM3-1 to CM3-10 to moving body devices 100.

In FIG. 11, a transformation unit 154 transforms moving directions (moving directions D21 to D25 (not illustrated)) included in the instruction information acquired by an acquisition unit 151 (instruction information CM3-1 to CM3-5) into moving directions (moving directions D21' to D25') in relative coordinate systems (relative coordinate systems C2-1 to C2-5) based on reference positions (reference positions P2-1 to P2-5) located at the predetermined relative positions (relative position vectors $\Delta_{21}$ to $\Delta_{23}$) from the position of the operation target of the moving bodies (moving body devices 100-1 to 100-5) (position of the bird O2 to be photographed) and the relative positions of the moving bodies. Also, the transformation unit 154 transforms moving directions (moving directions D31 to D35 (not illustrated)) included in the instruction information acquired by the acquisition unit 151 (instruction information CM3-6 to CM3-10) into moving directions (moving directions D31' to D35' (not illustrated)) in relative coordinate systems (relative coordinate systems C3-1 to C3-5 (not illustrated)) based on the reference positions (reference positions P3-1 to P3-5) located at the predetermined relative positions (relative position vectors $\Delta_{31}$ to $\Delta_{35}$) from the position of the operation target of the moving bodies (moving body devices 100-6 to 100-10) (position R of the bird O3 to be photographed) and the relative positions of the moving bodies.

1-6-4. Fourth Modification Example of the Embodiment

Figure 12:
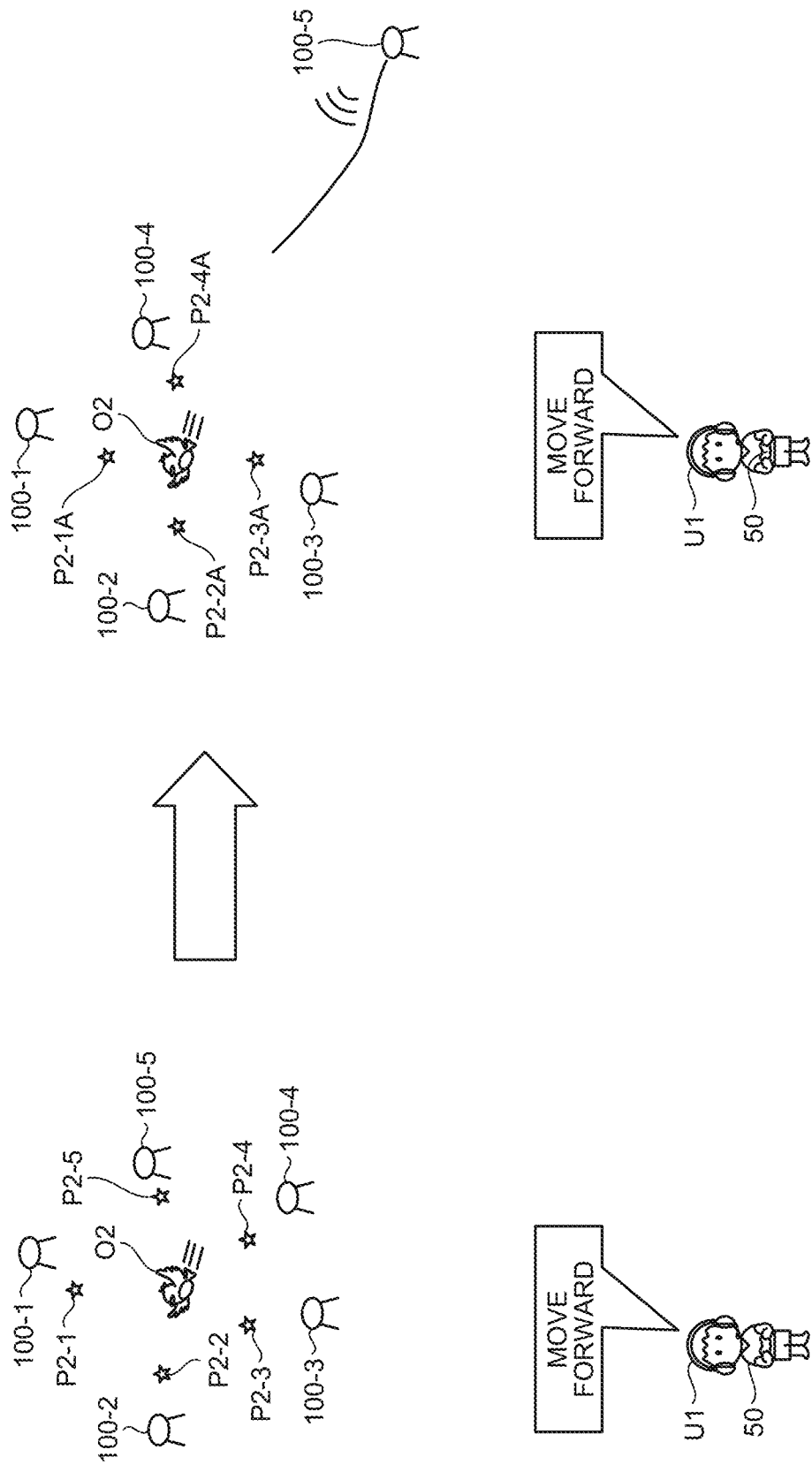
FIG. 12 is a view illustrating an example of information processing according to a fifth modification example of the present disclosure.

Next, an outline of information processing according to the fourth modification example of the present disclosure will be described with reference to FIG. 12. FIG. 12 is a view illustrating an example of the information processing according to the fourth modification example of the present disclosure. In the example illustrated in FIG. 12, among five moving body devices 100-1 to 100-5 surrounding a bird O2 to be photographed in a pentagonal shape, one moving body device 100-5 returns due to a decrease in a remaining battery level. The moving body device 100-5 broadcasts a return signal. When receiving the return signal from the moving body device 100-5, the remaining four moving body devices 100-1 to 100-4 change relative coordinate systems used for an operation in such a manner that the bird O2 to be photographed is surrounded in a square system.

In the following, processing of each of the four moving body devices 100-1 to 100-4 will be described. An acquisition unit 151 receives the return signal from the moving body device 100-5. When receiving the return signal, a determination unit 155 refers to a condition information storage unit 123 and determines that environmental information related to a surrounding environment of the moving body satisfies a condition identified by a condition information ID "CD1" (condition information CD1).

In the following, the moving body device 100-1 among the four moving body devices 100-1 to 100-4 will be described as an example. When the determination unit 155 determines that the environmental information related to the surrounding environment of the moving body satisfies the condition CD1, the acquisition unit 151 of the moving body device 100-1 acquires absolute coordinates of a position of the moving body device 100-1. Also, the acquisition unit 151 refers to a storage unit 120 and acquires absolute coordinates of a reference position P2-1A corresponding to the condition CD1. Note that it is assumed that a reference position corresponding to a predetermined condition is preset in the storage unit 120 in association with each condition. For example, it is assumed that a reference position corresponding to the condition CD1 is preset in such a manner as to be a relative position corresponding to each vertex of a pentagon surrounding a position of an object to be photographed when there are five moving body devices 100, and to be a relative position corresponding to each vertex of a quadrangle surrounding a position of an object to be photographed when there are four moving body devices 100.

When the absolute coordinates of the reference position P2-1A corresponding to the condition CD1 and the absolute coordinates of the position of the moving body device 100-1 are acquired by the acquisition unit 151, a calculation unit 152 calculates relative position coordinates of the position of the moving body device 100-1 with respect to the reference position P2-1A corresponding to the condition CD1 by subtracting the absolute coordinates of the reference position P2-1A corresponding to the condition CD1 from the absolute coordinates of the position of the moving body device 100-1.

When the relative coordinates of the position of the moving body device 100-1 with respect to the reference position P2-1A corresponding to the condition CD1 are calculated by the calculation unit 152, a deciding unit 153 decides a direction from the reference position P2-1A corresponding to the condition CD1 toward the position of the moving body device 100-1 as a Y-axis of the relative coordinate system. Also, the deciding unit 153 decides, as an X-axis of the relative coordinate system, a direction in which a vector in the direction from the reference position P2-1A corresponding to the condition CD1 toward the position of the moving body device 100-1 is rotated clockwise by 90 degrees. Also, the deciding unit 153 decides the reference position P2-1A corresponding to the condition CD1 as the origin of the relative coordinate system used for the operation.

A transformation unit 154 transforms a moving direction included in instruction information acquired by the acquisition unit 151 into a moving direction in the relative coordinate system based on the reference position P2-1A corresponding to the condition CD1 and the relative position of the moving body device 100-1.

Similarly to the moving body device 100-1, transformation units 154 of the moving body devices 100-2 to 100-4 respectively change reference positions P2-2 to P2-4 to reference positions P2-2A to P2-4A corresponding to the condition CD1, and transform moving directions included in instruction information acquired by the acquisition units 151 into moving directions in relative coordinate systems based on the changed reference positions P2-2A to P2-4A and the relative positions of the moving body devices 100-2 to 100-4.

In such a manner, the determination units 155 determine whether the environmental information related to the surrounding environment of the moving bodies satisfies the predetermined condition (detection of a return signal from another moving body). In a case where the determination units 155 determine that the environmental information satisfies the predetermined condition, the transformation units 154 change the reference positions (reference positions P2-1 to P2-4) into the reference positions corresponding to the predetermined condition (reference positions P2-1A to P2-4A), and transform the moving directions included in the instruction information acquired by the acquisition units 151 into the moving directions in the relative coordinate systems based on the changed reference positions and the relative positions of the moving bodies.

1-6-5. Fifth Modification Example of the Embodiment

Figure 13:
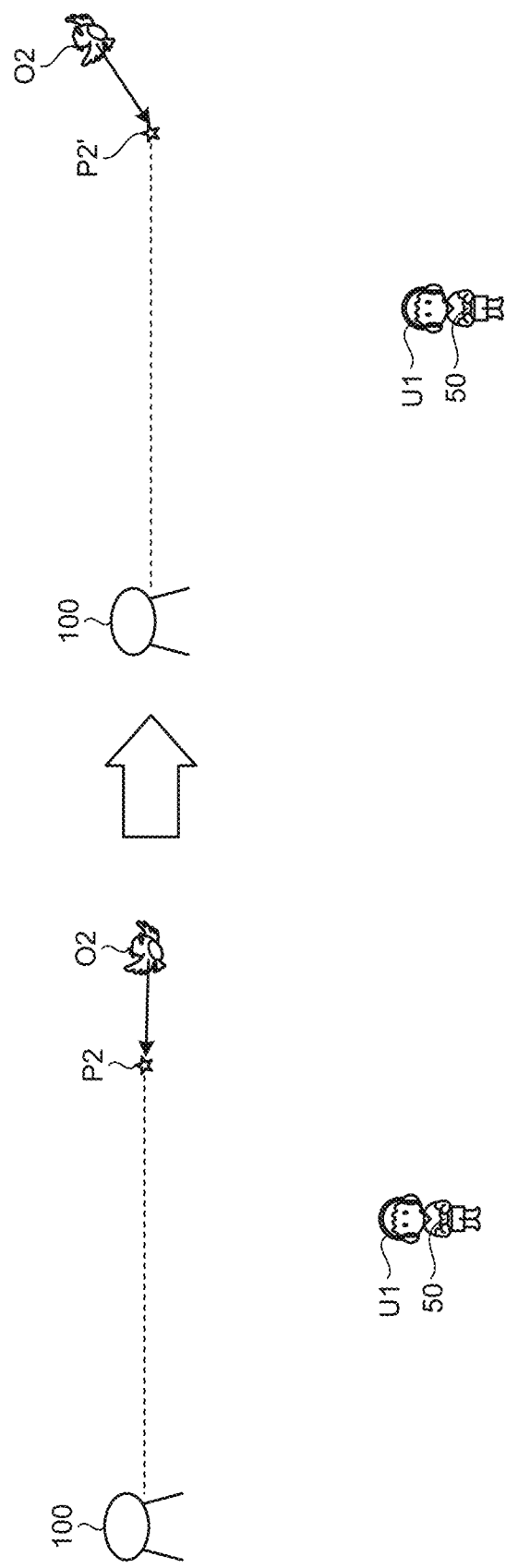
FIG. 13 is a view illustrating an example of information processing according to a sixth modification example of the present disclosure.

Next, an outline of information processing according to the fifth modification example of the present disclosure will be described with reference to FIG. 13. FIG. 13 is a view illustrating an example of the information processing according to the fifth modification example of the present disclosure. In the example illustrated in FIG. 13, a moving body device 100 moves in a manner of following a reference position with a predetermined position on the opposite side of a direction in which a bird O2 faces (traveling direction) being the reference position in such a manner as not to be noticed by the bird O2 to be photographed. Then, when detecting a change in the direction in which the bird O2 faces, the moving body device 100 switches a relative coordinate system. As a result, an operator U1 can operate the moving body device 100 in such a manner as not to be noticed by the bird O2 to be photographed.

Specifically, an acquisition unit 151 acquires a captured image acquired by photographing of the bird O2 to be photographed by an image sensor. A determination unit 155 detects the traveling direction of the bird O2 by image recognition or the like on the basis of the captured image acquired by the acquisition unit 151. Also, the determination unit 155 detects a change in the traveling direction of the bird O2 on the basis of the captured image acquired by the acquisition unit 151. For example, on the basis of the captured image acquired by the acquisition unit 151, the determination unit 155 determines whether an amount of change in the direction of the bird O2 within a predetermined time exceeds a threshold #2. In a case where it is determined that the amount of change in the direction of the bird O2 within the predetermined time exceeds the threshold #2, the determination unit 155 detects that the direction of the bird O2 is changed.

In such a manner, the acquisition unit 151 acquires, as environmental information, sensor information that is related to a surrounding environment of a moving body and detected by a sensor (image sensor) (image information and a direction of the bird O2 detected on the basis of the image information). The determination unit 155 determines whether the sensor information acquired by the acquisition unit 151 satisfies a predetermined condition (condition information CD2). For example, the determination unit determines whether an amount of change in the sensor information acquired by the acquisition unit 151 (amount of change in the direction of the bird O2 detected on the basis of the image information) satisfies a predetermined condition (exceeding the threshold #2 corresponding to the condition information CD2).

When detecting that the direction of the bird O2 is changed, the determination unit 155 refers to a condition information storage unit 123 and determines that the environmental information related to the surrounding environment of the moving body satisfies a condition identified by a condition information ID "CD2" (condition information CD2).

When the determination unit 155 determines that the environmental information related to the surrounding environment of the moving body satisfies the condition CD2, the acquisition unit 151 acquires absolute coordinates of a moving body position. Also, the acquisition unit 151 refers to a storage unit 120 and acquires absolute coordinates of a reference position P2' corresponding to the condition CD2. Note that it is assumed that the reference position P2' corresponding to the condition CD2 is preset in such a manner as to be a predetermined relative position from the object to be photographed in the direction opposite to the direction of the object to be photographed by the moving body (traveling direction).

A transformation unit 154 transforms a moving direction included in instruction information acquired by the acquisition unit 151 into a moving direction in a relative coordinate system based on the reference position P2' corresponding to the condition CD2 and a relative position of the moving body.

In such a manner, the transformation unit 154 transforms the moving direction included in the instruction information acquired by the acquisition unit 151 into the moving direction in the relative coordinate system based on the reference position located at the predetermined relative position determined according to the surrounding environment of the moving body (predetermined relative position determined according to the traveling direction of the bird O2) from the position of the operation target of the moving body (position of the bird O2 to be photographed) (reference position P2') and the relative position of the moving body.

1-6-6. Sixth Modification Example of the Embodiment

Next, an outline of information processing according to the sixth modification example of the present disclosure will be described with reference to FIG. 14. FIG. 14 is a view illustrating an example of the information processing according to the sixth modification example of the present disclosure. In the example illustrated in FIG. 14, a moving body device 100 photographs a pitcher of baseball O4 to be photographed. Then, when detecting that the pitcher O4 winds up, the moving body device 100 switches a reference position in a relative coordinate system from a position P3 of the pitcher O4 to a position P3' of a ball O5.

Specifically, before the pitcher O4 winds up, a transformation unit 154 transforms a moving direction included in instruction information acquired by an acquisition unit 151 into a moving direction in a relative coordinate system based on the reference position P3 (not illustrated), which is the position of the pitcher O4 to be photographed by the moving body, and a relative position of the moving body device 100.

In such a manner, the transformation unit 154 transforms the moving direction included in the instruction information acquired by the acquisition unit 151 into the moving direction in the relative coordinate system based on the reference position that is the position of the operation target of the moving body (position of the pitcher O4 to be photographed) (reference position P3 (not illustrated)) and the relative position of the moving body.

The acquisition unit 151 acquires a captured image acquired by photographing of the pitcher O4 to be photographed by an image sensor. On the basis of the captured image acquired by the acquisition unit 151, a determination unit 155 detects the winding up by the pitcher O4 by image recognition or the like. For example, on the basis of the captured image acquired by the acquisition unit 151, the determination unit 155 determines whether an amount of change in a pitching posture of the pitcher O4 within a predetermined time exceeds a threshold #3. In a case of determining that the amount of change in the pitching posture of the pitcher O4 within the predetermined time exceeds the threshold #3, the determination unit 155 detects the winding up by the pitcher O4.

When detecting the winding up by the pitcher O4, the determination unit 155 refers to a condition information storage unit 123 and determines that environmental information related to a surrounding environment of the moving body satisfies a condition identified by a condition information ID "CD3" (condition information CD3).

When the determination unit 155 determines that the environmental information related to the surrounding environment of the moving body satisfies the condition CD3, the acquisition unit 151 acquires absolute coordinates of a moving body position. Also, the acquisition unit 151 refers to a storage unit 120 and acquires absolute coordinates of a reference position P3' (not illustrated) corresponding to the condition CD3. Note that it is assumed that the reference position P3' corresponding to the condition CD3 is preset in such a manner as to be the position of the ball O5 when the winding up by the pitcher O4 is detected.

The transformation unit 154 transforms the moving direction included in the instruction information acquired by the acquisition unit 151 into a moving direction in a relative coordinate system based on the reference position P3' corresponding to the condition CD3 and the relative position of the moving body. Specifically, the transformation unit 154 transforms the moving direction included in the instruction information acquired by the acquisition unit 151 into the moving direction in the relative coordinate system based on the reference position that is the position of the operation target of the moving body (position of the ball O5 to be photographed) (reference position P3' (not illustrated)) and the relative position of the moving body.

1-6-7. Seventh Modification Example of the Embodiment

Figure 15:
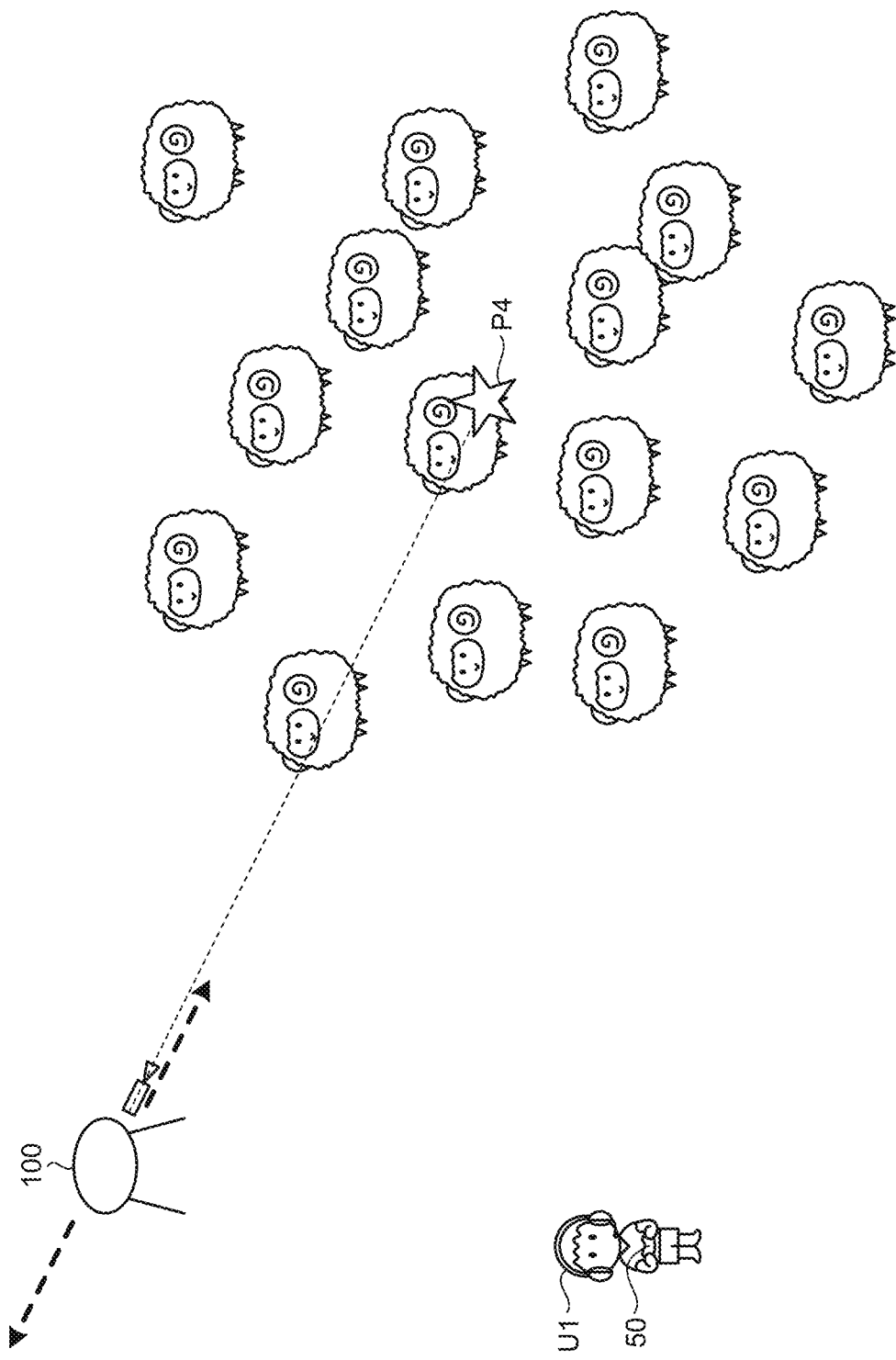
FIG. 15 is a view illustrating an example of information processing according to an eighth modification example of the present disclosure.

Next, an outline of information processing according to the seventh modification example of the present disclosure will be described with reference to FIG. 15. FIG. 15 is a view illustrating an example of the information processing according to the seventh modification example of the present disclosure. In the example illustrated in FIG. 15, a moving body device 100 photographs a herd of sheep. Specifically, a transformation unit 154 transforms a moving direction included in instruction information acquired by an acquisition unit 151 into a moving direction in a relative coordinate system based on a reference position P4, which is a position of a centroid of the herd of sheep to be photographed by the moving body, and a relative position of the moving body device 100. For example, the acquisition unit 151 detects the position of the centroid of the herd of sheep by image recognition on the basis of a captured image of the herd of sheep photographed by an image sensor.

1-6-8. Eighth Modification Example of the Embodiment

Figure 16:
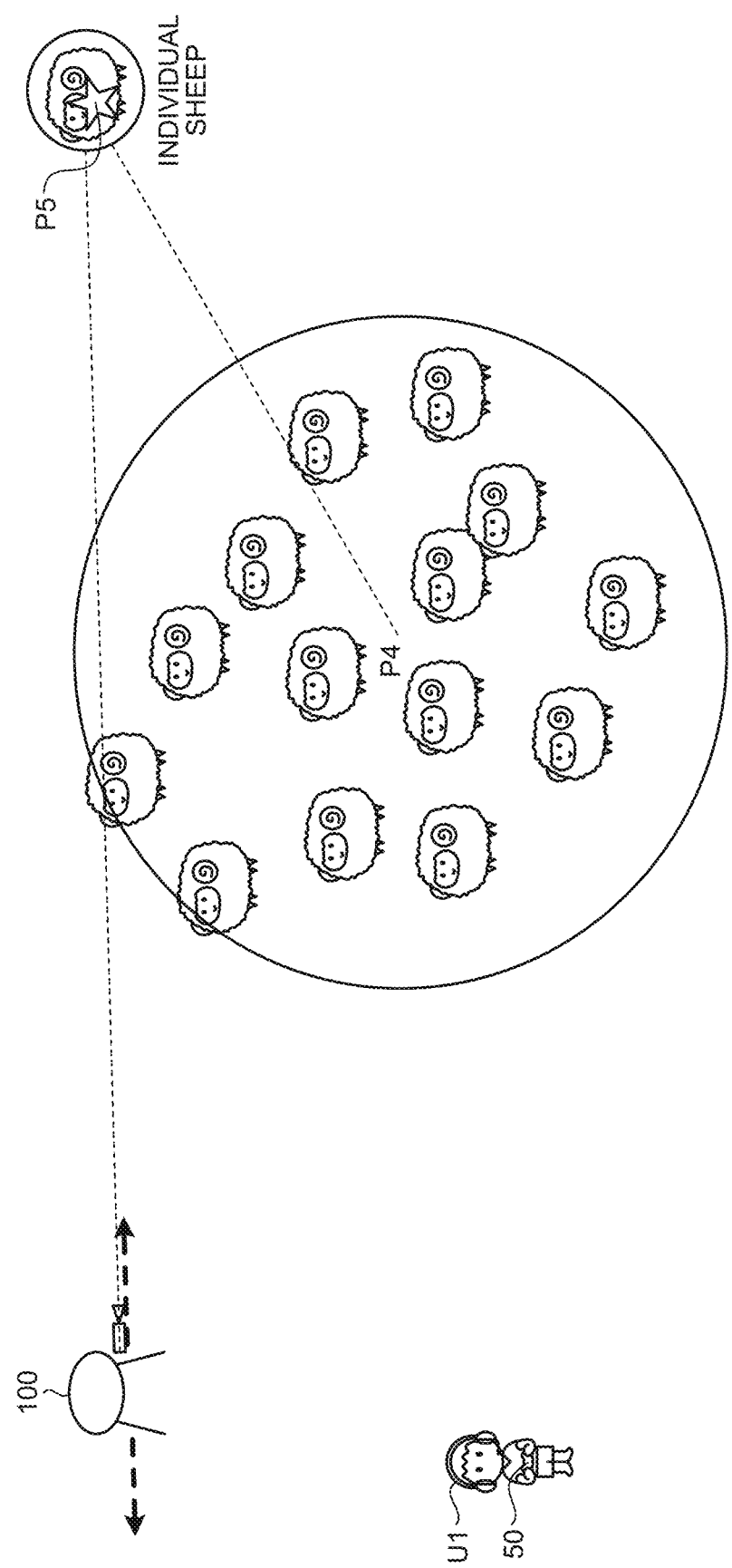
FIG. 16 is a view illustrating an example of information processing according to a ninth modification example of the present disclosure.

Next, an outline of information processing according to the eighth modification example of the present disclosure will be described with reference to FIG. 16. FIG. 16 is a view illustrating an example of the information processing according to the eighth modification example of the present disclosure. In the example illustrated in FIG. 16, a moving body device 100 photographs a herd of sheep to be photographed. Then, when detecting an individual sheep separated for a certain distance or more from a position of a centroid of the herd of sheep, the moving body device 100 switches a reference position of a relative coordinate system from a position P4 of the centroid of the herd of sheep to a position P5 of the individual sheep.

Specifically, an acquisition unit 151 acquires, by an image sensor, a captured image acquired by photographing of the herd of sheep to be photographed. A determination unit 155 detects the individual sheep separated from the position of the centroid of the herd of sheep by image recognition or the like on the basis of the captured image acquired by the acquisition unit 151. For example, on the basis of the captured image acquired by the acquisition unit 151, the determination unit 155 determines whether a distance between the position of the centroid of the herd of sheep and the individual sheep exceeds a threshold #5. In a case of determining that the distance between the position of the centroid of the herd of sheep and the individual sheep exceeds the threshold #5, the determination unit 155 detects the individual sheep separated for the certain distance or more from the position of the centroid of the herd of sheep.

When detecting the individual sheep separated for the certain distance or more from the position of the centroid of the herd of sheep, the determination unit 155 refers to a condition information storage unit 123 and determines that environmental information related to a surrounding environment of the moving body satisfies a condition identified by a condition information ID "CD5" (condition information CD5).

When the determination unit 155 determines that the environmental information related to the surrounding environment of the moving body satisfies the condition CD5, the acquisition unit 151 acquires absolute coordinates of a moving body position. Also, the acquisition unit 151 refers to a storage unit 120 and acquires absolute coordinates of the reference position P5 corresponding to the condition CD5. Note that the reference position P5 corresponding to the condition CD5 is preset in such a manner as to be a position of an individual sheep when the individual sheep separated for the certain distance or more from the position of the centroid of the herd of sheep is detected.

A transformation unit 154 transforms a moving direction included in instruction information acquired by the acquisition unit 151 into a moving direction in the relative coordinate system based on the reference position P5 corresponding to the condition CD5 and a relative position of the moving body. Specifically, the transformation unit 154 transforms the moving direction included in the instruction information acquired by the acquisition unit 151 into the moving direction in the relative coordinate system based on the reference position that is the position of the operation target of the moving body (position of the individual sheep to be photographed) (reference position P5) and the relative position of the moving body.

1-6-9. Ninth Modification Example of the Embodiment

Next, an outline of information processing according to the ninth modification example of the present disclosure will be described with reference to FIG. 17. FIG. 17 is a view illustrating an example of the information processing according to the ninth modification example of the present disclosure. In the example illustrated in FIG. 17, a moving body device 100 photographs a firework while holding, as a reference position, a position at a moment when the firework explodes. As a result, while the surroundings are dark and it is difficult to operate the moving body device 100, an operator U1 can operate the moving body device 100 with concentration only on whether to keep a distance to the firework.

Specifically, by a light sensor, an acquisition unit 151 detects a light quantity caused by the explosion of the firework. A determination unit 155 determines whether the light quantity acquired by the acquisition unit 151 exceeds a threshold #6. In a case of determining that the light quantity exceeds the threshold #6, the determination unit 155 detects the explosion of the firework.

When detecting the explosion of the firework, the determination unit 155 refers to a condition information storage unit 123 and determines that environmental information related to a surrounding environment of the moving body satisfies a condition identified by a condition information ID "CD6" (condition information CD6).

When the determination unit 155 determines that the environmental information related to the surrounding environment of the moving body satisfies the condition CD6, the acquisition unit 151 acquires absolute coordinates of a moving body position. Also, the acquisition unit 151 refers to a storage unit 120 and acquires absolute coordinates of a reference position P6 corresponding to the condition CD6. Note that it is assumed that the reference position P6 corresponding to the condition CD6 is preset in such a manner as to be the position at the moment when the firework explodes. Note that the acquisition unit 151 detects the position at the moment when the firework explodes, for example, by an image sensor.

A transformation unit 154 transforms a moving direction included in instruction information acquired by the acquisition unit 151 into a moving direction in a relative coordinate system based on the reference position P6 corresponding to the condition CD6 and a relative position of the moving body. Specifically, the transformation unit 154 transforms the moving direction included in the instruction information acquired by the acquisition unit 151 into the moving direction in the relative coordinate system based on the reference position that is the position of the operation target of the moving body (position of the moment when the firework to be photographed explodes) (reference position P6) and the relative position of the moving body.

1-6-10. Tenth Modification Example of the Embodiment

Next, an outline of information processing according to the tenth modification example of the present disclosure will be described with reference to FIG. 18. FIG. 18 is a view illustrating an example of the information processing according to the tenth modification example of the present disclosure. In the example illustrated in FIG. 18, a moving body device 100 photographs a firework with a position at a moment when the firework explodes being a reference position P7. Then, when detecting an announcement that a finale is about to be started (many fireworks are set off), the moving body device 100 switches a reference position in a relative coordinate system from the position P7 at the moment when the firework explodes to a position P8 of a centroid of a plurality of fireworks.

Specifically, an acquisition unit 151 acquires, by a sound sensor, sound information of the announcement indicating "the finale is about to be started (many fireworks are set off)". A determination unit 155 detects the announcement of the finale by natural language processing or the like on the basis of the sound information acquired by the acquisition unit 151. For example, the determination unit 155 transforms the sound information acquired by the acquisition unit 151 into character information, performs collation with preset character information corresponding to the announcement of the finale, and determines whether the acquired sound information is the announcement of the finale.

When detecting the announcement of the finale, a determination unit 157 refers to a condition information storage unit 123 and determines that environmental information related to a surrounding environment of the moving body satisfies a condition identified by a condition information ID "CD7" (condition information CD7).

When the determination unit 157 determines that the environmental information related to the surrounding environment of the moving body satisfies the condition CD7, the acquisition unit 151 acquires absolute coordinates of a moving body position. Also, the acquisition unit 151 refers to a storage unit 120 and acquires absolute coordinates of the reference position P8 corresponding to the condition CD7. Note that it is assumed that the reference position P8 corresponding to the condition CD7 is preset in such a manner as to be the position of the centroid of the plurality of fireworks when the announcement of the finale is detected.

A transformation unit 154 transforms a moving direction included in instruction information acquired by the acquisition unit 151 into a moving direction in the relative coordinate system based on the reference position P8 corresponding to the condition CD7 and a relative position of the moving body. Specifically, the transformation unit 154 transforms the moving direction included in the instruction information acquired by the acquisition unit 151 into the moving direction in the relative coordinate system based on the reference position that is the position of the operation target of the moving body (position of the centroid of the plurality of fireworks to be photographed) (reference position P8) and the relative position of the moving body.

1-6-11. Eleventh Modification Example of the Embodiment

Figure 19:
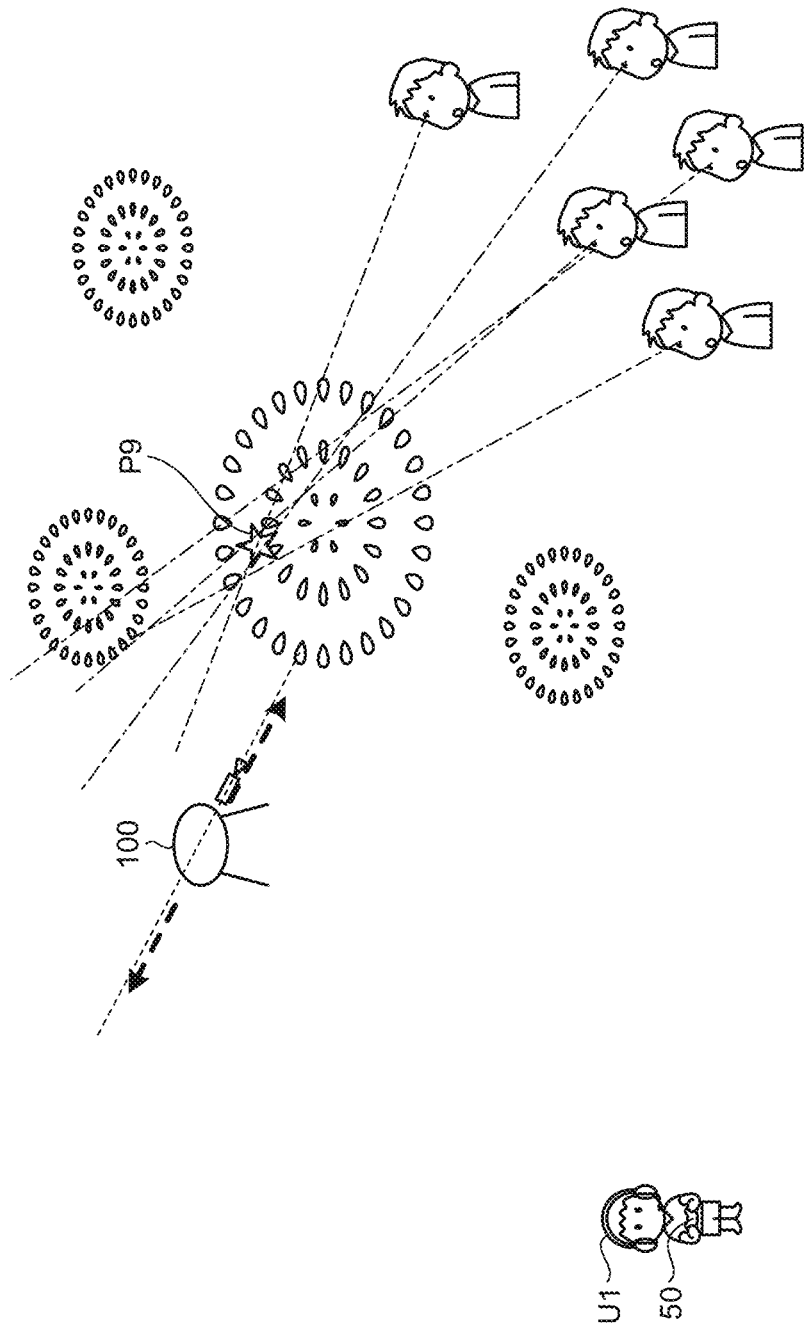
FIG. 19 is a view illustrating an example of information processing according to a twelfth modification example of the present disclosure.

Next, an outline of information processing according to the eleventh modification example of the present disclosure will be described with reference to FIG. 19. FIG. 19 is a view illustrating an example of the information processing according to the eleventh modification example of the present disclosure. In the example illustrated in FIG. 19, a moving body device 100 photographs a firework from lines of sight of a crowd with destinations of the lines of sight of the crowd which destinations are other than the firework to be photographed being a reference position P9.

Specifically, by an image sensor, an acquisition unit 151 acquires a captured image including a firework and a crowd around the firework. When a case where the crowd has five people is described as an example, on the basis of the captured image acquired by the acquisition unit 151, a determination unit 157 estimates five straight lines representing destinations of lines of sight of the five people and detects a point at which the sum of distances to the five straight lines is minimized.

When detecting the point at which the sum of the distances to the five straight lines is minimized, the determination unit 157 refers to a condition information storage unit 123 and determines that environmental information related to a surrounding environment of the moving body satisfies a condition identified by a condition information ID "CD8" (condition information CD8).

When the determination unit 157 determines that the environmental information related to the surrounding environment of the moving body satisfies the condition CD8, the acquisition unit 151 acquires absolute coordinates of a moving body position. Also, the acquisition unit 151 refers to a storage unit 120 and acquires absolute coordinates of the reference position P9 corresponding to the condition CD8. Note that it is assumed the reference position P9 corresponding to the condition CD8 is preset in such a manner as to be a position of the point at which the sum of the distances to the plurality of straight lines representing the destinations of the lines of sight of the crowd is minimized.

A transformation unit 154 transforms a moving direction included in instruction information acquired by the acquisition unit 151 into a moving direction in a relative coordinate system based on the reference position P9 corresponding to the condition CD8 and a relative position of the moving body.

1-6-12. Twelfth Modification Example of the Embodiment

Figure 20:
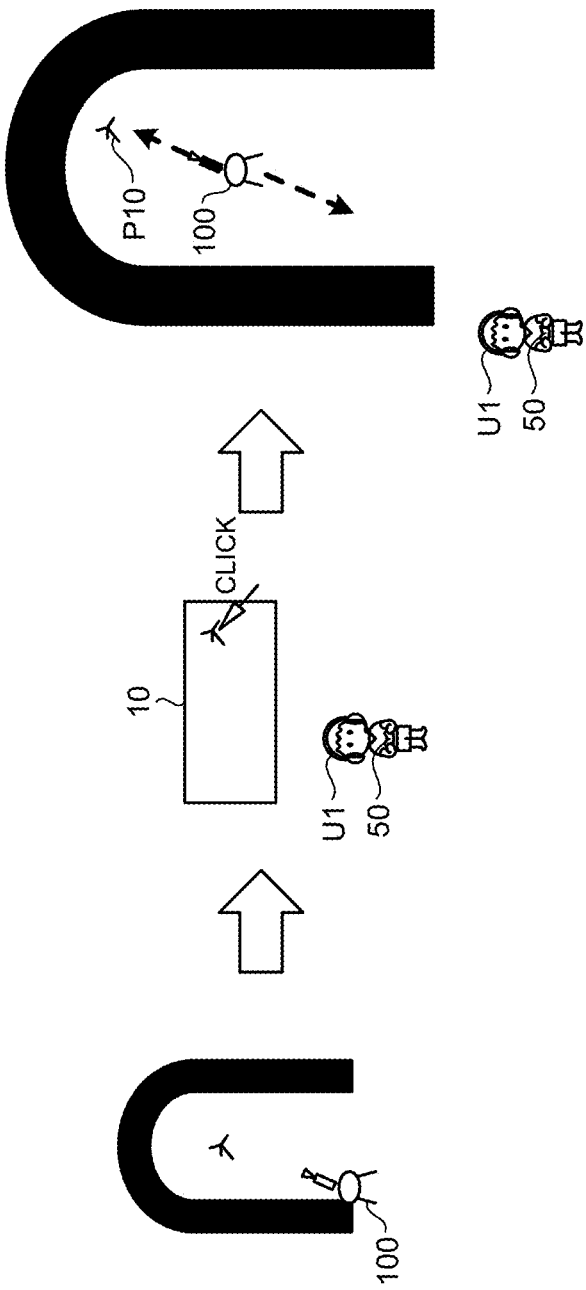
FIG. 20 is a view illustrating an example of information processing according to a thirteenth modification example of the present disclosure.

Next, an outline of information processing according to the twelfth modification example of the present disclosure will be described with reference to FIG. 20. FIG. 20 is a view illustrating an example of the information processing according to the twelfth modification example of the present disclosure. As illustrated on the left side in FIG. 20, a moving body device 100 photographs an entire wall of a tunnel while hovering. An image captured by the moving body device 100 is displayed on a screen of a terminal device 10 of an operator U1.

Subsequently, as illustrated in the center of FIG. 20, the operator U1 selects (for example, clicks) a portion having a flaw (crack) on the wall while viewing the image displayed on the screen of the terminal device 10, and registers the selected point as a reference position P10. A control device 50 acquires, from the terminal device 10, information related to the reference position P10 selected by the operator U1. Note that the terminal device 10 and the control device 50 may be integrated. Also, the moving body device 100 may detect an abnormal portion (such as flaw) on the wall, and decide the detected abnormal portion as the reference position P10. A transformation unit 154 transforms a moving direction included in instruction information acquired by an acquisition unit 151 into a moving direction in a relative coordinate system based on the reference position P10 and a relative position of the moving body.

As a result, the operator U1 can operate the moving body device 100 by using the relative coordinate system of the moving body device 100 with respect to the reference position P10. As a result, the operator U1 can perform an operation of bringing the moving body device 100 closer to or away from the abnormal portion only by tilting a stick of the control device 50 back and forth. That is, the operator U1 can easily perform zoom-out photographing and zoom-in photographing of the abnormal portion.

1-6-13. Thirteenth Modification Example of the Embodiment

Figure 21:
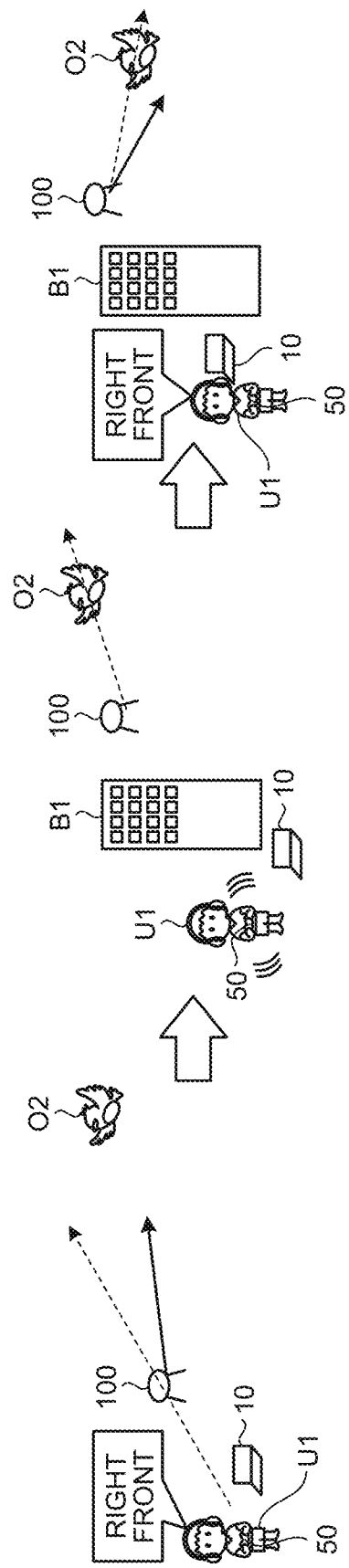
FIG. 21 is a view illustrating an example of information processing according to a fourteenth modification example of the present disclosure.

Next, an outline of information processing according to the thirteenth modification example of the present disclosure will be described with reference to FIG. 21. FIG. 21 is a view illustrating an example of the information processing according to the thirteenth modification example of the present disclosure. In the example illustrated in FIG. 21, a moving body device 100 photographs a bird O2 while moving with a position of a control device 50 being a reference position. Then, for example, when detecting that an infrared ray received from the control device 50 is blocked by a blocking object (such as building B1) or the like, the moving body device 100 switches a reference position of a relative coordinate system from the position of the control device 50 to a position of the bird O2 to be photographed.

Specifically, an acquisition unit 151 receives the infrared ray from the control device 50. A determination unit 157 detects, by an infrared sensor, that the reception of the infrared ray is blocked.

When detecting that the reception of the infrared ray is blocked, the determination unit 157 refers to a condition information storage unit 123 and determines that environmental information related to a surrounding environment of the moving body satisfies a condition identified by a condition information ID "CD9" (condition information CD9).

When the determination unit 157 determines that the environmental information related to the surrounding environment of the moving body satisfies the condition CD9, the acquisition unit 151 acquires absolute coordinates of a moving body position. Also, the acquisition unit 151 refers to a storage unit 120 and acquires absolute coordinates of a reference position corresponding to the condition CD9. Note that it is assumed that the reference position corresponding to the condition CD9 is preset in such a manner as to be the position of the object to be photographed when blocking of the infrared ray is detected.

A transformation unit 154 transforms a moving direction included in instruction information acquired by the acquisition unit 151 into a moving direction in a relative coordinate system based on the reference position corresponding to the condition CD9 (position of the bird O2) and a relative position of the moving body. Even in a case where it becomes impossible to visually recognize the moving body device 100 or the bird O2 to be photographed directly due to the blocking object, the operator U1 can continuously operate the moving body device 100 while viewing the screen of the terminal device 10.

Note that a transmission unit 157 may transmit, to the control device 50, notification indicating that blocking of the infrared ray is detected and switching to the relative coordinate system in which the position of the bird O2 is set as the reference position is performed. When receiving the notification related to the switching of the coordinate system, the control device 50 may notify the operator U1 of the switching of the coordinate system by vibrating a main body of the control device 50.

1-6-14. Fourteenth Modification Example of the Embodiment

Next, an outline of information processing according to the fourteenth modification example of the present disclosure will be described with reference to FIG. 22.

FIG. 22 is a view illustrating an example of the information processing according to the fourteenth modification example of the present disclosure. In an example illustrated in an upper part of FIG. 22, a face device F1 is attached to a moving body device 100 in order to present a direction of the moving body device 100 to an operator U1 in an easy-to-understand manner. Note that a display may be attached to the moving body device 100 and an arrow may be drawn in a front direction. Also, an LED may be attached around the moving body device 100, and a direction in which the moving body device 100 moves in the front direction toward the operator U1 may be illuminated by a light ray of the LED.

In an example illustrated in a lower part of FIG. 22, in order to present a moving direction of the moving body device 100 to the operator U1 in an easy-to-understand manner, the moving body device 100 directs the face device F1 in a direction calculated from a relative coordinate system and a moving direction included in instruction information. Note that an LED may be attached around the moving body device 100, and the moving body device 100 may illuminate, with a light ray of the LED, the direction calculated from the relative coordinate system and the moving direction included in the instruction information.

1-6-15. Fifteenth Modification Example of the Embodiment

First, an outline of information processing according to other embodiments of the present disclosure will be described with reference to FIG. 23. FIG. 23 is a view illustrating an example of the information processing according to the other embodiments of the present disclosure. In the example illustrated in FIG. 23, a display control unit 555 outputs auxiliary content generated by a generation unit 554 to an output unit 54. Specifically, the display control unit 555 displays, in a manner visible to the operator, the simulation image of a case where the moving direction of the moving body is controlled on the basis of the moving direction acquired by the transformation of the moving direction of the moving body, which direction is instructed by the operator, into the moving direction in the relative coordinate system based on the reference position, which is determined according to the surrounding environment of the moving body, and the relative position of the moving body.

[2. Other Embodiments] [2-1. Case where Moving Body Moves in Three-Dimensional Space]

In the above-described embodiment, in order to facilitate understanding, an example in which a moving body device 100 according to the embodiment moves on a two-dimensional plane has been described. However, the moving body device 100 according to the embodiment may move in a three-dimensional space. In a case where the moving body device 100 moves in the three-dimensional space, it is necessary to determine directions of two axes among directions of three axes for defining the space or to determine one axis among the directions of the three axes and a predetermined plane.

For example, the moving body device 100 decides, as a front direction (such as X-axis), a direction of looking up the moving body device 100 from a reference position. Then, for example, a direction in which an operator U1 stands is decided as a Z-axis. Alternatively, in a case of outer space or the like, a direction of a light source (such as the sun) may be decided as the Z-axis. Alternatively, a place where the operator U1, an operation target (such as object to be photographed), and any other objects (such as person other than the operator, animal, and planet such as the moon or the earth) are present may be decided as an XY plane. Alternatively, an (approximate) plane where a plurality of moving body devices 100 is present may be decided as the XY plane.

3. Effects According to the Present Disclosure

As described above, the information processing device according to the present disclosure (moving body device 100 in the embodiment) includes the acquisition unit (acquisition unit 151 in the embodiment), the transformation unit (transformation unit 154 in the embodiment), and the control unit (movement control unit 156 in the embodiment). The acquisition unit acquires instruction information including an instruction from an operator on a moving direction for a moving body. The transformation unit transforms the moving direction included in the instruction information acquired by the acquisition unit into a moving direction in a relative coordinate system based on a reference position, which is determined according to a surrounding environment of the moving body, and a relative position of the moving body. The control unit controls a moving direction of the moving body on the basis of the moving direction transformed by the transformation unit.

In such a manner, the information processing device according to the embodiment of the present disclosure can move the moving body while considering the relative position with respect to the reference position. As a result, the information processing device makes it possible to move the moving body in a direction intended by the operator even in a case where a direction or posture of the moving body is suddenly changed due to a disturbance such as wind. Also, an information processing device 0 makes it possible to easily give an instruction on the moving direction even in a case where the direction of the moving body operated by a semi-automatic operation is greatly changed by obstacle avoidance. Thus, the information processing device can appropriately control the moving direction of the moving body.

Also, the transformation unit transforms the moving direction included in the instruction information acquired by the acquisition unit into the moving direction in the relative coordinate system based on the reference position, which is a position of the operator, and the relative position of the moving body.

As a result, the information processing device makes it possible to more easily give the instruction on the moving direction of the moving body on the basis of a relative coordinate system based on a reference position, which is a position of a creator, and the relative position of the moving body.

Also, the transformation unit transforms the moving direction included in the instruction information acquired by the acquisition unit into the moving direction in the relative coordinate system based on the reference position, which is a position of an operation target of the moving body, and the relative position of the moving body.

As a result, the information processing device makes it possible to more easily give the instruction on the moving direction of the moving body on the basis of the relative coordinate system based on the reference position, which is the position of the operation target of the moving body, and the relative position of the moving body.

Also, the transformation unit transforms the moving direction included in the instruction information acquired by the acquisition unit into the moving direction in the relative coordinate system based on the reference position, which is located at a predetermined relative position from the position of the operation target of the moving body, and the relative position of the moving body.

As a result, the information processing device makes it possible to more easily give the instruction on the moving direction of the moving body in such a manner that operation is performed while the operation target is tracked from a position slightly away from the position of the operation target, for example.

Also, the transformation unit transforms the moving direction included in the instruction information acquired by the acquisition unit into the moving direction in the relative coordinate system based on the reference position located at a predetermined relative position, which is determined according to the surrounding environment of the moving body, from the position of the operation target of the moving body and the relative position of the moving body.

As a result, the information processing device can dynamically change the position, which is slightly away from the position of the operation target, according to the surrounding environment of the moving body.

Also, the transformation unit transforms the moving direction included in the instruction information acquired by the acquisition unit into the moving direction in the relative coordinate system based on the reference position, which is a position of an object to be photographed by the moving body, and the relative position of the moving body.

As a result, the information processing device makes it possible to more easily give the instruction on the moving direction of the moving body in such a manner that photographing is performed while the object to be photographed is tracked from a position slightly away from the position of the object to be photographed, for example.

Also, the information processing device according to the present disclosure further includes the determination unit (determination unit 155 in the embodiment). The determination unit determines whether environmental information related to the surrounding environment of the moving body satisfies a predetermined condition. In a case where the determination unit determines that the environmental information satisfies the predetermined condition, the transformation unit changes a reference position to a reference position corresponding to the predetermined condition, and transforms the moving direction included in the instruction information acquired by the acquisition unit into the moving direction in the relative coordinate system based on the changed reference position and the relative position of the moving body.

As a result, the information processing device can dynamically change the coordinate system according to the surrounding environment of the moving body.

Also, the acquisition unit acquires, as the environmental information, sensor information that is related to the surrounding environment of the moving body and detected by a sensor. The determination unit determines whether the sensor information acquired by the acquisition unit satisfies a predetermined condition.

As a result, the information processing device can dynamically change the coordinate system according to the surrounding environment of various moving bodies detected by various sensors.

Also, the determination unit determines whether an amount of change in the sensor information acquired by the acquisition unit satisfies a predetermined condition.

As a result, the information processing device can dynamically change the coordinate system according to a change in the surrounding environment of various moving bodies detected by various sensors.

Also, the control device according to the present disclosure (control device 50 in the embodiment) includes the display control unit (display control unit 555 in the embodiment). The display control unit displays, in a manner visible to the operator, a simulation image of a case where the moving direction of the moving body is controlled on the basis of a moving direction acquired by the transformation of the moving direction of the moving body, which direction is instructed by the operator, into the moving direction in the relative coordinate system based on the reference position, which is determined according to the surrounding environment of the moving body, and the relative position of the moving body.

As a result, the control device can improve usability in operation control of the moving body.

4. Hardware Configuration

Figure 24:
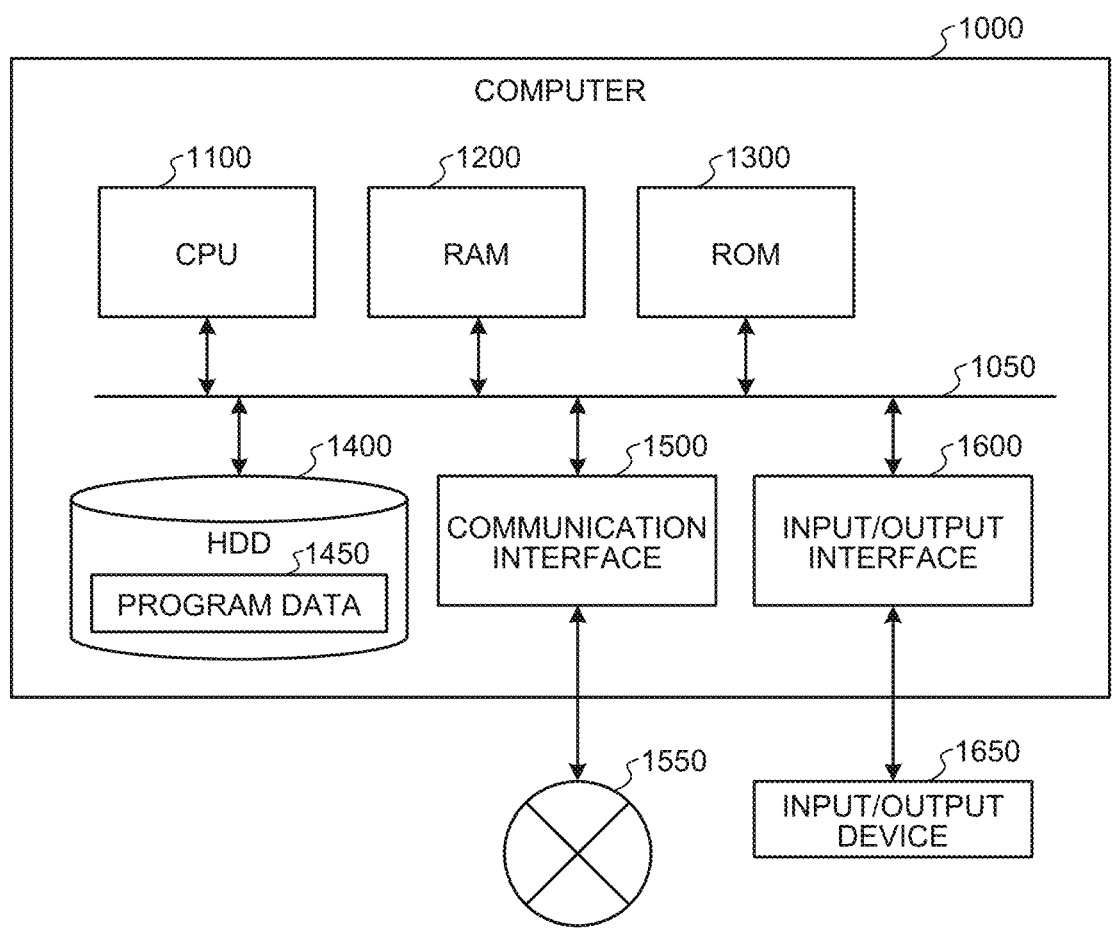
FIG. 24 is a hardware configuration diagram illustrating an example of a computer that realizes functions of an information processing device.

Information equipment such as a moving body device 100 according to each of the embodiment and modification examples described above is realized by a computer 1000 having a configuration in a manner illustrated in FIG. 24, for example. FIG. 24 is a hardware configuration diagram illustrating an example of the computer 1000 that realizes functions of an information processing device such as the moving body device 100. Hereinafter, the moving body device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. More specifically, the HDD 1400 is a recording medium that records an information processing program according to the present disclosure which program is an example of program data 1450.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a keyboard or a mouse via the input/output interface 1600. Also, the CPU 1100 transmits data to an output device such as a display, a speaker, or a printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the moving body device 100 according to the embodiment, the CPU 1100 of the computer 1000 realizes a function of the control unit 150 or the like by executing the information processing program loaded on the RAM 1200. Also, the HDD 1400 stores an information processing program according to the present disclosure, and data in the storage unit 120. Note that the CPU 1100 reads the program data 1450 from the HDD 1400 and performs execution thereof, but may acquire, in another example, these programs from another device via the external network 1550.

Note that the present technology can also have the following configurations.

(1)

An information processing device comprising:

an acquisition unit that acquires instruction information including an instruction from an operator on a moving direction for a moving body;

a transformation unit that transforms the moving direction included in the instruction information acquired by the acquisition unit into a moving direction in a relative coordinate system based on a reference position, which is determined according to a surrounding environment of the moving body, and a relative position of the moving body; and a control unit that controls a moving direction of the moving body on the basis of the moving direction transformed by the transformation unit.

(2)

The information processing device according to (1), wherein the transformation unit transforms the moving direction included in the instruction information acquired by the acquisition unit into the moving direction in the relative coordinate system based on the reference position, which is a position of the operator, and the relative position of the moving body.

(3)

The information processing device according to (1) or (2), wherein the transformation unit transforms the moving direction included in the instruction information acquired by the acquisition unit into the moving direction in the relative coordinate system based on the reference position, which is a position of an operation target of the moving body, and the relative position of the moving body.

(4)

The information processing device according to (3), wherein the transformation unit transforms the moving direction included in the instruction information acquired by the acquisition unit into the moving direction in the relative coordinate system based on the reference position, which is located at a predetermined relative position from the position of the operation target of the moving body, and the relative position of the moving body.

(5)

The information processing device according to (4), wherein the transformation unit transforms the moving direction included in the instruction information acquired by the acquisition unit into the moving direction in the relative coordinate system based on the reference position located at the predetermined relative position, which is determined according to the surrounding environment of the moving body, from the position of the operation target of the moving body and the relative position of the moving body.

(6)

The information processing device according to any of (3) to (5), wherein the transformation unit transforms the moving direction included in the instruction information acquired by the acquisition unit into the moving direction in the relative coordinate system based on the reference position, which is a position of an object to be photographed by the moving body, and the relative position of the moving body.

(7)

The information processing device according to any of (1) to (6), further comprising a determination unit that determines whether environmental information related to the surrounding environment of the moving body satisfies a predetermined condition, wherein the transformation unit changes, in a case where the determination unit determines that the environment information satisfies the predetermined condition, the reference position to a reference position corresponding to the predetermined condition, and transforms the moving direction included in the instruction information acquired by the acquisition unit into a moving direction in a relative coordinate system based on the changed reference position and the relative position of the moving body.

(8)

The information processing device according to (7), wherein the acquisition unit acquires, as the environmental information, sensor information that is related to the surrounding environment of the moving body and detected by a sensor, and the determination unit determines whether the sensor information acquired by the acquisition unit satisfies a predetermined condition.

(9)

The information processing device according to (8), wherein the determination unit determines whether an amount of change in the sensor information acquired by the acquisition unit satisfies a predetermined condition.

(10)

A control device comprising:

a display control unit that displays, in a manner visible to an operator, a simulation image of a case where a moving direction of a moving body which direction is instructed by the operator is transformed into a moving direction in a relative coordinate system based on a reference position determined according to a surrounding environment of the moving body and a relative position of the moving body and a moving direction of the moving body is controlled on the basis of the transformed moving direction.

(11)

An information processing method comprising:

executing processing of acquiring instruction information including an instruction from an operator on a moving direction for a moving body, transforming the moving direction included in the acquired instruction information into a moving direction in a relative coordinate system based on a reference position, which is determined according to a surrounding environment of the 4 moving body, and a relative position of the moving body, and controlling a moving direction of the moving body on the basis of the transformed moving direction.

(12)

An information processing program causing a computer to execute an acquisition procedure of acquiring instruction information including an instruction from an operator on a moving direction for a moving body, a transformation procedure of transforming the moving direction included in the instruction information acquired by the acquisition procedure into a moving direction in a relative coordinate system based on a reference position, which is determined according to a surrounding environment of the moving body, and a relative position of the moving body, and a control procedure of controlling a moving direction of the moving body on the basis of the moving direction transformed by the transformation procedure.

REFERENCE SIGNS LIST

1 INFORMATION PROCESSING SYSTEM
50 CONTROL DEVICE
51 COMMUNICATION UNIT
52 STORAGE UNIT
53 INPUT UNIT
54 OUTPUT UNIT
55 CONTROL UNIT
551 ACCEPTING UNIT
552 TRANSMISSION UNIT
553 RECEPTION UNIT
554 GENERATION UNIT
555 DISPLAY CONTROL UNIT

100 MOVING BODY DEVICE
110 COMMUNICATION UNIT
120 STORAGE UNIT
121 INSTRUCTION INFORMATION STORAGE UNIT
122 PROCESSING INFORMATION STORAGE UNIT
123 CONDITION INFORMATION STORAGE UNIT
130 PHYSICAL SENSOR
140 DRIVE UNIT
150 CONTROL UNIT
151 ACQUISITION UNIT
152 CALCULATION UNIT
153 DECIDING UNIT
154 TRANSFORMATION UNIT
155 DETERMINATION UNIT
156 MOVEMENT CONTROL UNIT
157 TRANSMISSION UNIT

The invention claimed is:

1. An information processing device comprising:
circuitry configured to
acquire instruction information including instruction from an operator on a first moving direction for a moving body in an absolute coordinate system,
transform, in real time, the first moving direction included in the acquired instruction information into a second moving direction in a relative coordinate system based on a reference position, which is determined according to a surrounding environment of the moving body, and a relative position of the moving body to the reference position, the reference position being determined based on a centroid of a group comprising a plurality of operation targets as a group to be photographed by the moving body,
determine that the one of the plurality of targets is separated from the group, under a condition that a distance between the one of the plurality of targets and the centroid of the group exceeds a predetermined threshold,
switch the reference position, in the relative coordinate system, from the current reference position determined based on the plurality of targets, to a new reference position determined based on the one of the plurality of targets that is separate from the group, and
control the moving body on the basis of the second moving direction.

2. The information processing device according to claim 1, wherein
the circuitry is configured to
transform the first moving direction included in the acquired instruction information into the second moving direction in the relative coordinate system based on the reference position, which is a position of at least one of operation targets of the moving body, and the relative position of the moving body.

3. The information processing device according to claim 2, wherein
the circuitry is configured to
transform the first moving direction included in the acquired instruction information into the second moving direction in the relative coordinate system based on the reference position, which is located at a predetermined relative position from the position of at least one of the operation targets of the moving body, and the relative position of the moving body.

4. The information processing device according to claim 3, wherein
the circuitry is configured to
transform the first moving direction included in the acquired instruction information into the second moving direction in the relative coordinate system based on the reference position located at the predetermined relative position, which is determined according to the surrounding environment of the moving body, from the position of at least one of the operation targets of the moving body and the relative position of the moving body.

5. The information processing device according to claim 1, wherein the circuitry is configured to determine whether environmental information related to the surrounding environment of the moving body satisfies a predetermined condition, change, in a case where the circuitry determines that the environment information satisfies the predetermined condition, the reference position to a reference position corresponding to the predetermined condition, and
transform the first moving direction included in the acquired instruction information into the second moving direction in a relative coordinate system based on the changed reference position and the relative position of the moving body.

6. The information processing device according to claim 5, wherein
the circuitry is configured to acquire, as the environmental information, sensor information that is related to the surrounding environment of the moving body and detected by a sensor, and
determine whether the acquired sensor information acquired by satisfies a predetermined condition.

7. The information processing device according to claim 5, wherein
the circuitry is configured to
determine whether an amount of change in the acquired sensor information acquired satisfies the predetermined condition.

8. A control device comprising:
circuitry configured to
control transmission of instruction from an operator on a first moving direction for a moving body in an absolute coordinate system, to the moving body, and
display, in a manner visible to the operator, a simulation image of a case where the first moving direction of the moving body is transformed, in real time, into a second moving direction in a relative coordinate system based on a reference position determined according to a surrounding environment of the moving body and a relative position of the moving body and the moving body is controlled on the basis of the transformed second moving direction,
wherein the reference position is determined based on a centroid of a group comprising a plurality of operation targets as a group to be photographed by the moving body,
under a condition that a distance between the one of the plurality of targets and the centroid of the group exceeds a predetermined threshold, it is determined that the one of the plurality of targets is separated from the group,
the reference position is switched, in the relative coordinate system, from the current reference position determined based on the plurality of targets, to a new reference position determined based on the one of the plurality of targets that is separate from the group.

9. An information processing method comprising:
acquiring instruction information including an instruction from an operator on a first moving direction for a moving body in an absolute coordinate system;
transforming, in real time, the first moving direction included in the acquired instruction information into a second moving direction in a relative coordinate system based on a reference position, which is determined according to a surrounding environment of the 4 moving body, and a relative position of the moving body to the reference position, the reference position being determined based on a centroid of a group comprising a plurality of operation targets as a group to be photographed by the moving body;
determining that the one of the plurality of targets is separated from the group, under a condition that a distance between the one of the plurality of targets and the centroid of the group exceeds a predetermined threshold;
switching the reference position, in the relative coordinate system, from the current reference position determined based on the plurality of targets, to a new reference position determined based on the one of the plurality of targets that is separate from the group; and
controlling the moving body on the basis of the transformed second moving direction.

10. A non-transitory computer-readable storage medium including computer executable instructions, wherein the instructions, when executed by an information processing device, cause the information processing device to perform a method, the method comprising:
acquiring instruction information including an instruction from an operator on a first moving direction for a moving body in an absolute coordinate system;
transforming, in real time, the first moving direction included in the acquired instruction information into a second moving direction in a relative coordinate system based on a reference position, which is determined according to a surrounding environment of the moving body, and a relative position of the moving body to the reference position, the reference position being determined based on a centroid of a group comprising a plurality of operation targets as a group to be photographed by the moving body;
determining that the one of the plurality of targets is separated from the group, under a condition that a distance between the one of the plurality of targets and the centroid of the group exceeds a predetermined threshold;
switching the reference position, in the relative coordinate system, from the current reference position determined based on the plurality of targets, to a new reference position determined based on the one of the plurality of targets that is separate from the group; and
controlling the moving body on the basis of the transformed second moving direction.

* * * * *